United States Patent
Dhar Roy et al.

(10) Patent No.: US 12,071,534 B2
(45) Date of Patent: Aug. 27, 2024

(54) POLYOLEFIN COMPOSITIONS SUITABLE FOR FILMS

(71) Applicant: ExxonMobil Chemical Patents Inc., Baytown, TX (US)

(72) Inventors: Sushanta Dhar Roy, Houston, TX (US); Bradley A. Kramer, Houston, TX (US); Ying Zou, Shanghai (CN); Jasper Holsbeek, Tienen (BE); Stefan B. Ohlsson, Keerbergen (BE); Maciej M. Pasniewski, Vlaams Brabant (BE); Mosha H. Zhao, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 588 days.

(21) Appl. No.: 17/309,237

(22) PCT Filed: Nov. 11, 2019

(86) PCT No.: PCT/US2019/060687
§ 371 (c)(1),
(2) Date: May 10, 2021

(87) PCT Pub. No.: WO2020/102057
PCT Pub. Date: May 22, 2020

(65) Prior Publication Data
US 2022/0017730 A1    Jan. 20, 2022

Related U.S. Application Data

(60) Provisional application No. 62/768,312, filed on Nov. 16, 2018.

(30) Foreign Application Priority Data

Jan. 7, 2019 (EP) .................................. 19150462

(51) Int. Cl.
*C08L 23/06* (2006.01)
*B32B 27/08* (2006.01)
(Continued)

(52) U.S. Cl.
CPC .............. *C08L 23/06* (2013.01); *B32B 27/08* (2013.01); *B32B 27/32* (2013.01); *C08J 5/18* (2013.01);
(Continued)

(58) Field of Classification Search
CPC ...... C08L 23/04; C08L 23/08; C08L 23/0807; C08L 23/0815; C08L 23/14;
(Continued)

(56) References Cited

U.S. PATENT DOCUMENTS

2005/0064218 A1* 3/2005 Davis .................... B32B 27/32
428/218
2016/0347888 A1* 12/2016 Lue .................... C08F 4/65904
(Continued)

FOREIGN PATENT DOCUMENTS

WO    WO-2018208398 A1 * 11/2018 ............. B32B 27/08

*Primary Examiner* — Mark S Kaucher
(74) *Attorney, Agent, or Firm* — ExxonMobil Technology and Engineering Company—Chemicals

(57) ABSTRACT

The present disclosure provides polyolefin compositions and films and method for producing such films. The polyolefin composition contains about 40 wt % to about 95 wt % of a BOCD polyethylene and about 10 wt % to about 60 wt % of a polypropylene, by weight of the polyolefin composition. The polyolefin composition has a 1% secant flexural modulus MD of greater than 250 MPa and a 1% secant flexural modulus TD of greater than 300 MPa, as determined for a layer of the polyolefin composition having a thickness of about 50 μm and a Dart Impact (Method A) of greater than 15 g/μm and an Elmendorf tear MD of greater than 7 g/μm, (Continued)

as determined for a film containing the polyolefin composition and having a thickness of about 90 μm.

10 Claims, 3 Drawing Sheets

(51) Int. Cl.
    *B32B 27/32*     (2006.01)
    *C08J 5/18*     (2006.01)
    *C08L 23/08*     (2006.01)
    *C08L 23/12*     (2006.01)

(52) U.S. Cl.
    CPC ........... *C08L 23/0815* (2013.01); *C08L 23/12* (2013.01); *B32B 2250/03* (2013.01); *B32B 2250/242* (2013.01); *C08L 2205/025* (2013.01); *C08L 2205/03* (2013.01); *C08L 2207/066* (2013.01)

(58) Field of Classification Search
    CPC .. C08L 23/142; C08L 23/10; C08L 2205/025; C08L 2205/03; C08L 2207/066; C08L 23/06; C08L 23/12; C08J 5/18
    See application file for complete search history.

(56) References Cited

U.S. PATENT DOCUMENTS

2018/0298174 A1    10/2018    Reichelt et al.
2020/0325290 A1*  10/2020    Schmitt ................... B32B 27/32

\* cited by examiner

POLYOLEFIN COMPOSITIONS SUITABLE FOR FILMS

PRIORITY CROSS-REFERENCE OF RELATED APPLICATIONS

This application is a National Phase Application claiming priority to PCT Application Serial No. PCT/US2019/060687, filed Nov. 11, 2019, which claims priority to and the benefit of U.S. Provisional Application No. 62/768,312, filed Nov. 16, 2018, and also to European Patent Application No. 1915004 62.0 which was filed Jan. 7, 2019, the disclosures of which are incorporated herein by reference.

FIELD

The present disclosure provides compositions containing polyethylene-based materials and polypropylene-based materials and methods of forming films from the same.

BACKGROUND

In producing polymeric films, especially blown films, polymers with good processability are desired to achieve commercial throughput rates, while maintaining sufficient toughness. Further, desirable physical properties for the final film product include stiffness, roughness, or tear strength. High density polyethylene (HDPE) and polypropylene (PP) are two possible blending partners for polyethylene (PE) film to increase the stiffness. However, there are limited cases for selecting PP as a blending partner, because PP and PE have different crystallinity phases and types, and there is little to no co-crystallinity between PP and PE. Lean blending PP with PE can increase PE film stiffness while decreasing the PE film toughness at same time.

On the other hand, PP contains many advantages versus HDPE, like much lower density, higher stiffness, and higher heat resistance. If PP can be used in a majority PE formulation to improve the film stiffness part while still maintaining toughness properties, it will show huge value for industrial and food package down-gauging of the PP/PE film structure.

Therefore, there is a need for improved polyolefin compositions having an enhanced toughness and high stiffness, and a method for blowing films from the polyolefin compositions.

Reference(s) of interest include WO 2017/68106.

SUMMARY

The present disclosure provides polyolefin compositions that contain one or more broad orthogonal composition distribution (BOCD) polyethylenes and one or more polypropylenes. In any embodiment, the polyolefin composition comprises (or consists of, or consists essentially of) of a BOCD polyethylene and a polypropylene, by weight of the polyolefin composition. The BOCD polyethylene contains about 70 mol % to about 100 mol % of ethylene and has a density of about 0.91 g/cm³ to about 0.925 g/cm³, in accordance with ASTM D-4703 and ASTM D-1505/ISO 1183 and a branching index (g'vis) of 0.98 or greater.

In any embodiment, a polyolefin composition comprises (or consists of, or consists essentially of) about 40 wt % to about 95 wt % of a BOCD polyethylene containing about 70 mol % to about 100 mol % of ethylene and about 10 wt % to about 60 wt % of a polypropylene, by weight of the polyolefin composition. The polyolefin composition has a 1% secant flexural modulus MD of greater than 250 MPa and a 1% secant flexural modulus TD of greater than 300 MPa, as determined for a layer of the polyolefin composition having a thickness of about 50 µm. The polyolefin composition also has a Dart Impact (Method A) of greater than 15 g/µm and an Elmendorf tear MD of greater than 7 g/µm, as determined for a film containing the polyolefin composition and having a thickness of about 90 µm.

In any embodiment, the polyolefin composition comprises (or consists of, or consists essentially of) about 40 wt % to about 95 wt % of a BOCD polyethylene and about 10 wt % to about 60 wt % of a polypropylene, by weight of the polyolefin composition. The BOCD polyethylene contains about 70 mol % to about 100 mol % of ethylene and has a density of about 0.91 g/cm³ to about 0.925 g/cm³, in accordance with ASTM D-4703 and ASTM D-1505/ISO 1183 and a branching index ($g'_{vis}$) of 0.98 or greater. In any embodiment, the polypropylene is a high melt strength polypropylene (HMS PP), contains at least 50 mol % propylene content, and has a molecular weight distribution (Mw/Mn) from about 7 to about 22, a z-average molecular weight of less than 2,500,000 g/mol, a branching index ($g'_{vis}$) of 0.95 or greater, and a melt strength of less than 20 cN determined using an extensional rheometer at 190° C.

In any embodiment, a method of forming a film includes extruding a polyolefin composition through one or more die openings to form the film. For example, the method can include extruding a molten polyolefin composition containing one or more BOCD polyethylenes and one or more polypropylenes through the die opening to form the film, and cooling the film at a distance away from the die opening to produce a finished film. The film can be cooled by blowing air, nitrogen, argon, or other gases on at least a portion of the film.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

Figure 1A:
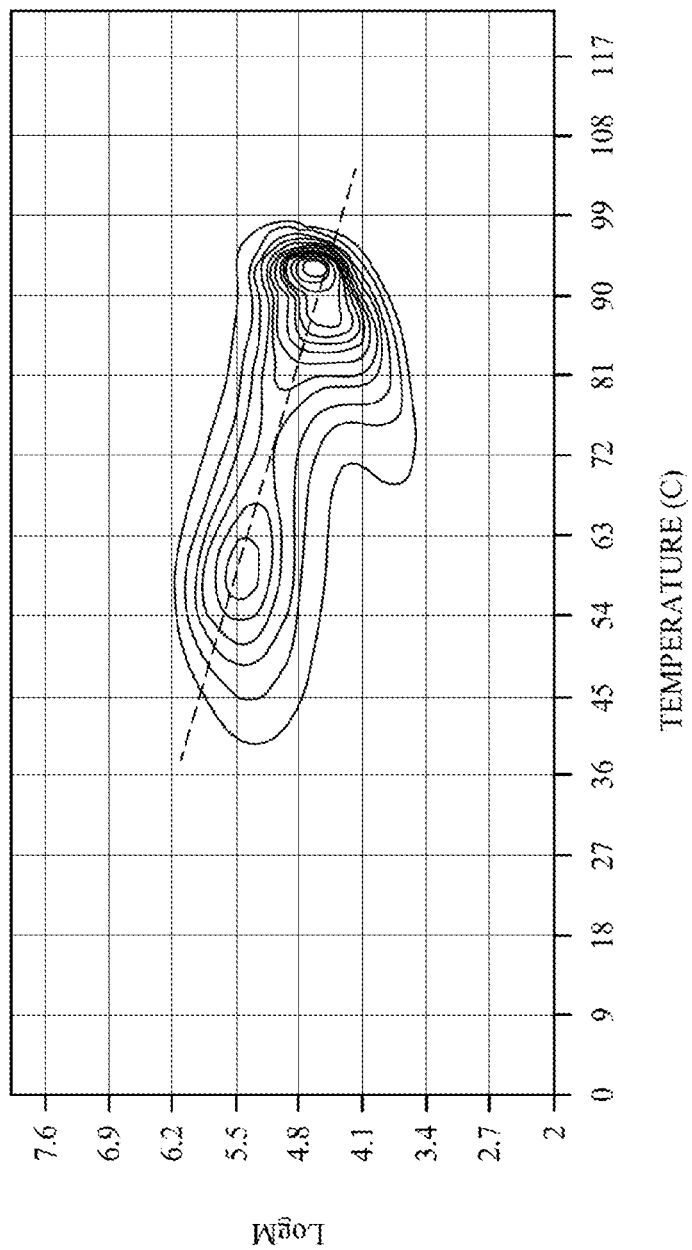
FIGS. 1A and 1B are TREF contour plots which are used to determine if a polyethylene is a BOCD PE polymer (FIG. 1A) as opposed to a conventional PE polymer (FIG. 1B).

To facilitate understanding, identical reference numerals have been used, where possible, to designate identical elements that are common to the Figures. It is contemplated that elements and features of one implementation may be beneficially incorporated in other implementations without further recitation.

DETAILED DESCRIPTION

The present disclosure provides polyolefin compositions that contain one or more broad orthogonal composition distribution (BOCD) polyethylenes and one or more polypropylenes. In one or more examples, the polypropylene can be or include one or more high melt strength polypropylenes (HMS PPs) and/or one or more trimmed polypropylenes (tPPs). The polyolefin compositions have an enhanced toughness and a greater stiffness compared to conventional BOCD polyethylenes. Films made from such compositions preferably have a stiffness (Modulus) of at least 250 MPa, and toughness (Dart Impact) of at least 15 g/μm.

Multiple types of films can be produced using the polyolefin composition. For example, the following types of layers and films contain the polyolefin composition: a monolayer containing the polyolefin composition, a two-layer film having a layer containing the polyolefin composition and a layer containing a BOCD polyethylene, and several configurations of three-layer films where one, two, or three layers contain the polyolefin composition. In one or more examples, the three-layer film has a core layer containing the polyolefin composition disposed between two skin layers containing a BOCD polyethylene. In some examples, the three-layer film has a core layer containing the polyolefin composition disposed between two skin layers containing the polyolefin composition. In other examples, the three-layer film has a core layer containing a BOCD polyethylene disposed between two skin layers containing the polyolefin composition.

In any embodiment, the polyolefin composition contains from about 30 wt %, about 35 wt %, about 40 wt %, about 45 wt %, or about 50 wt % to about 55 wt %, about 60 wt %, about 65 wt %, about 70 wt %, about 75 wt %, about 80 wt %, about 85 wt %, about 90 wt %, or about 95 wt % of the BOCD polyethylene, by weight of the polyolefin composition. For example, the polyolefin composition contains from about 30 wt % to about 95 wt %, about 35 wt % to about 95 wt %, about 40 wt % to about 95 wt %, about 50 wt % to about 95 wt %, about 60 wt % to about 95 wt %, about 70 wt % to about 95 wt %, about 80 wt % to about 95 wt %, about 90 wt % to about 95 wt %, about 30 wt % to about 90 wt %, about 35 wt % to about 90 wt %, about 40 wt % to about 90 wt %, about 50 wt % to about 90 wt %, about 60 wt % to about 90 wt %, about 70 wt % to about to 90 wt %, about 80 wt % to about 90 wt %, about 85 wt % to about 90 wt %, about 30 wt % to about 80 wt %, about 35 wt % to about 80 wt %, about 40 wt % to about 80 wt %, about 50 wt % to about 80 wt %, about 60 wt % to about 80 wt %, about 70 wt % to about 80 wt %, or about 75 wt % to about 80 wt % of the BOCD polyethylene, by weight of the polyolefin composition.

The polyolefin composition contains from about 5 wt %, about 10 wt %, about 15 wt %, about 20 wt %, about 25 wt %, or about 30 wt % to about 35 wt %, about 40 wt %, about 45 wt %, about 50 wt %, about 55 wt %, about 60 wt %, about 65 wt %, or about 70 wt % of the polypropylene, by weight of the polyolefin composition. For example, the polyolefin composition contains from about 5 wt % to about 70 wt %, about 5 wt % to about 60 wt %, about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 70 wt %, about 10 wt % to about 60 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 20 wt % to about 70 wt %, about 20 wt % to about 60 wt %, about 20 wt % to about 50 wt %, about 20 wt % to about 45 wt %, about 20 wt % to about 40 wt %, about 20 wt % to about 35 wt %, about 20 wt % to about 30 wt %, or about 20 wt % to about 25 wt % of the polypropylene, by weight of the polyolefin composition.

In one or more examples, the polyolefin composition contains from about 40 wt % to about 95 wt % of the BOCD polyethylene and about 5 wt % to about 60 wt % of a polypropylene, by weight of the polyolefin composition. In some examples, the polyolefin composition contains about 50 wt % to about 90 wt % of the BOCD polyethylene and about 10 wt % to about 50 wt % of a polypropylene, by weight of the polyolefin composition. In other examples, the polyolefin composition contains about 55 wt % to about 80 wt % of the BOCD polyethylene and about 20 wt % to about 45 wt % of a polypropylene, by weight of the polyolefin composition. In other examples, the polyolefin composition contains about 60 wt % to about 75 wt % of the BOCD polyethylene and about 25 wt % to about 40 wt % of a polypropylene, by weight of the polyolefin composition.

In any embodiment, a monolayer containing the polyolefin composition has relatively high values for the 1% secant flexural modulus, in each of the machine direction (MD) and the transverse direction (TD). The polyolefin composition has a 1% secant flexural modulus MD (in the machine direction) of greater than 250 MPa, such as about 300 MPa, about 400 MPa, about 500 MPa, or about 600 MPa to about 700 MPa, about 800 MPa, about 900 MPa, about 1,000 MPa, about 1,200 MPa, about 1,500 MPa or greater, as determined for a layer (e.g., monolayer or core layer) of the polyolefin composition having a thickness of about 50 μm. For example, the polyolefin composition has a 1% secant flexural modulus MD of about from 300 MPa to about 1,500 MPa, about 300 MPa to about 1,200 MPa, about 300 MPa to about 1,000 MPa, about 300 MPa to about 800 MPa, about 300 MPa to about 600 MPa, about 300 MPa to about 500 MPa, about 400 MPa to about 1,200 MPa, about 400 MPa to about 1,000 MPa, about 400 MPa to about 800 MPa, or about 400 MPa to about 600 MPa, as determined for a layer of the polyolefin composition having a thickness of about 50 μm. The 1% secant flexural modulus is determined by the ExxonMobil PLFL-242.001 standard, as provided below in the Experiments section.

The polyolefin composition has a 1% secant flexural modulus TD (in the traverse direction) of greater than 300 MPa, such as from about 320 MPa, about 340 MPa, about 350 MPa, about 400 MPa, about 500 MPa, or about 600 MPa to about 700 MPa, about 800 MPa, about 900 MPa, about 1,000 MPa, about 1,200 MPa, about 1,500 MPa or greater, as determined for a layer (e.g., monolayer or core layer) of the polyolefin composition having a thickness of about 50 μm. For example, the polyolefin composition has a 1% secant flexural modulus TD of from about 340 MPa to about 1,500 MPa, about 340 MPa to about 1,200 MPa, about 340 MPa to about 1,000 MPa, about 340 MPa to about 800 MPa, about 340 MPa to about 600 MPa, about 340 MPa to about 500 MPa, about 400 MPa to about 1,200 MPa, about 400 MPa to about 1,000 MPa, about 400 MPa to about 800 MPa, or about 400 MPa to about 600 MPa, as determined for a layer of the polyolefin composition having a thickness of about 50 μm.

The polyolefin composition has a Dart Impact (Method A) of greater than 5 g/μm, such as from about 10 g/μm, about 15 g/μm, or about 20 g/μm to about 25 g/μm, about 30 g/μm, about 35 g/μm, about 40 g/μm, about 45 g/μm, or about 50 g/μm, as determined for a layer (e.g., monolayer or core layer) containing the polyolefin composition and having a thickness of about 50 μm. For example, the polyolefin composition has a Dart Impact (Method A) of greater than 5 g/μm to about 50 g/μm, about 10 g/μm to about 50 g/μm, about 20 g/μm to about 50 g/μm, about 30 g/μm to about 50 g/μm, or about 40 g/μm to about 50 g/μm, as determined for a layer containing the polyolefin composition and having a thickness of about 50 μm.

The polyolefin composition has an Elmendorf tear MD (machine direction) of greater than 4 g/μm, such as from about 4.5 g/μm, about 5 g/μm, about 5.5 g/μm, or about 6 g/μm to about 6.5 g/μm, about 7 g/μm, about 7.5 g/μm, about 8 g/μm, about 8.5 g/μm, about 9 g/μm, about 9.5 g/μm, or about 10 g/μm, as determined for a layer (e.g., monolayer or core layer) containing the polyolefin composition and having a thickness of about 50 μm. For example, the polyolefin composition has an Elmendorf tear MD of greater than 4 g/μm to about 10 g/μm, about 4 g/μm to about 10 g/μm, about 5 g/μm to about 10 g/μm, about 6 g/μm to about 10 g/μm, about 7 g/μm to about 10 g/μm, about 8 g/μm to about 10 g/μm, or about 9 g/μm to about 10 g/μm, as determined for a layer containing the polyolefin composition and having a thickness of about 50 μm. The Elmendorf tear MD and TD values provided herein are determined by the ASTM D1922 standard.

The polyolefin composition has an Elmendorf tear TD (traverse direction) of greater than 5 g/μm or greater than 6 g/μm, such as from about 6.5 g/μm, about 7 g/μm, about 8 g/μm, or about 9 g/μm to about 10 g/μm, about 11 g/μm, about 12 g/μm, about 13 g/μm, about 14 g/μm, about 15 g/μm, or about 16 g/μm, as determined for a layer (e.g., monolayer or core layer) containing the polyolefin composition and having a thickness of about 50 μm. For example, the polyolefin composition has an Elmendorf tear TD of greater than 5 g/μm to about 16 g/μm, about 6 g/μm to about 16 g/μm, about 7 g/μm to about 16 g/μm, about 8 g/μm to about 16 g/μm, about 10 g/μm to about 16 g/μm, about 12 g/μm to about 16 g/μm, or about 14 g/μm to about 16 g/μm, as determined for a layer containing the polyolefin composition and having a thickness of about 50 μm.

In any embodiment, a three-layer film has a core layer containing the polyolefin composition disposed between two skin layers containing a BOCD polyethylene. The polyolefin composition has a Dart Impact (Method A) of greater than 15 g/μm, such as from about 15.5 g/μm, about 16 g/μm, about 16.5 g/μm, or about 17 g/μm to about 17.5 g/μm, about 18 g/μm, about 18.5 g/μm, about 19 g/μm, about 19.5 g/μm, about 20 g/μm, or about 22 g/μm, as determined for a film (e.g., 2, 3, 4, or more layer film) containing the polyolefin composition and having a thickness of about 90 μm. For example, the polyolefin composition has a Dart Impact (Method A) of greater than 15 g/μm to about 22 g/μm, greater than 15 g/μm to about 20 g/μm, greater than 15 g/μm to about 18 g/μm, greater than 15 g/μm to about 17 g/μm, greater than 15 g/μm to about 16 g/μm, about 16 g/μm to about 22 g/μm, about 16 g/μm to about 20 g/μm, about 16 g/μm to about 18 g/μm, about 16 g/μm to about 17 g/μm, as determined for a film containing the polyolefin composition and having a thickness of about 90 μm.

The polyolefin composition has an Elmendorf tear MD (machine direction) of greater than 7 g/μm, such as about 7.2 g/μm, about 7.5 g/μm, about 7.8 g/μm, or about 8 g/μm to about 8.2 g/μm, about 8.5 g/μm, about 8.8 g/μm, about 9 g/μm, about 9.2 g/μm, about 9.5 g/μm, about 9.8 g/μm, or about 10 g/μm, as determined for a film (e.g., 2, 3, 4, or more layer film) containing the polyolefin composition and having a thickness of about 90 μm. For example, the polyolefin composition has an Elmendorf tear MD of greater than 7 g/μm to about 10 g/μm, greater than 7 g/μm to about 9.5 g/μm, greater than 7 g/μm to about 9.2 g/μm, greater than 7 g/μm to about 9 g/μm, greater than 7 g/μm to about 8.5 g/μm, greater than 7 g/μm to about 8 g/μm, greater than 7 g/μm to about 7.8 g/μm, greater than 7 g/μm to about 7.5 g/μm, about 7.2 g/μm to about 10 g/μm, about 7.5 g/μm to about 9.5 g/μm, or about 8 g/μm to about 9.2 g/μm, about 8 g/μm to about 10 g/μm, about 8 g/μm to about 9.5 g/μm, about 8 g/μm to about 9.2 g/μm, about 8 g/μm to about 9 g/μm, or about 8 g/μm to about 8.5 g/μm, as determined for a film containing the polyolefin composition and having a thickness of about 90 μm. The Elmendorf tear MD and TD values provided herein are determined by the ASTM D1922 standard.

The polyolefin composition has an Elmendorf tear TD (traverse direction) of greater than 12.8 g/μm or greater than 13 g/μm, such as about 13.2 g/μm, about 13.5 g/μm, about 13.8 g/μm, about 14 g/μm, about 14.2 g/μm, or about 14.5 g/μm to about 14.8 g/μm, about 15 g/μm, about 15.2 g/μm, about 15.5 g/μm, about 15.8 g/μm, or about 16 g/μm, as determined for a film (e.g., 2, 3, 4, or more layer film) containing the polyolefin composition and having a thickness of about 90 μm. For example, the polyolefin composition has an Elmendorf tear TD of greater than 12.8 g/μm to about 16 g/μm, about 12.8 g/μm to about 16 g/μm, about 13 g/μm to about 14.5 g/μm, greater than 13 g/μm to about 16 g/μm, greater than 13 g/μm to about 15.5 g/μm, greater than 13 g/μm to about 15 g/μm, greater than 13 g/μm to about 14.5 g/μm, greater than 13 g/μm to about 14 g/μm, greater than 13 g/μm to about 13.5 g/μm, about 13.5 g/μm to about 16 g/μm, about 13.5 g/μm to about 15.5 g/μm, about 13.5 g/μm to about 15 g/μm, about 13.5 g/μm to about 14.5 g/μm, or about 13.5 g/μm to about 14 g/μm, as determined for a film containing the polyolefin composition and having a thickness of about 90 μm.

The polyolefin composition has a 1% secant flexural modulus, in each of the machine direction (MD) and the transverse direction (TD), independently, of from about 300 MPa, about 400 MPa, about 450 MPa, or about 500 MPa to about 550 MPa, about 600 MPa, about 650 MPa, about 700 MPa, about 800 MPa, about 900 MPa, or about 1,000 MPa, as determined for a film (e.g., 2, 3, 4, or more layer film) containing the polyolefin composition and having a thickness of about 90 μm. For example, the polyolefin composition has a 1% secant flexural modulus MD of about 300 MPa to about 1,500 MPa, about 300 MPa to about 1,200 MPa, about 300 MPa to about 1,000 MPa, about 300 MPa to about 800 MPa, about 300 MPa to about 600 MPa, about 300 MPa to about 500 MPa, about 400 MPa to about 1,200 MPa, about 400 MPa to about 1,000 MPa, about 400 MPa to about 800 MPa, or about 400 MPa to about 600 MPa, as determined for a film of the polyolefin composition having a thickness of about 90 μm.

The polyolefin composition has a Tensile at Break, in each of the machine direction (MD) and the transverse direction (TD), independently, of from about 25 MPa, about 30 MPa, about 40 MPa, about 45 MPa, or about 50 MPa to about 55 MPa, about 60 MPa, about 65 MPa, about 70 MPa, about 80 MPa, or about 100 MPa, as determined for a film (e.g., 2, 3, 4, or more layer film) containing the polyolefin composition and having a thickness of about 90 μm. For example, the polyolefin composition has a Tensile at Break, in each of the machine direction (MD) and the transverse direction (TD), independently, of about 25 MPa to about 100 MPa, about 30 MPa to about 100 MPa, about 30 MPa to about 80 MPa, about 30 MPa to about 60 MPa, about 30 MPa to about 50 MPa, or about 30 MPa to about 40 MPa, as determined for a film of the polyolefin composition having a thickness of about 90 μm. The 1% secant flexural modulus is determined by the ExxonMobil PLFL-242.001 standard, as provided below in the Experiments section.

BOCD Polyethylenes

The polyolefin compositions of the present disclosure include one or more broad orthogonal composition distribution (BOCD) polyethylenes. It can be desirable for the polyethylene copolymers to possess a broad orthogonal composition distribution which provides enhanced stiffness, toughness, and processability (S/T/P) balance of the polyethylene and compositions that include these polymers. Given that polymers are a blend of molecules having a distribution of different chain-lengths, polymers having BOCD are branched polymers that have a preponderance, if not all, of any branching that may occur on the high molecular weight molecules of the polymer, making them less crystalline. This microstructure has a tendency to improve certain properties of products made from such BOCD-type polymers including the polyolefin composition described and discussed herein.

Ziegler-Natta ("ZN") produced polyethylenes tend not to have a BOCD-type structure, most of the short-chain branching being on the low molecular weight portion of the molecules thus produced. Some Metallocene polyethylenes, on the other hand, often can have BOCD-type structure. The value of BOCD polymers relative to conventional polymers is significant.

In any embodiment, the BOCD polyethylene may have an orthogonal comonomer distribution or "broad orthogonal composition distribution" ("BOCD"). The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt %. In any embodiment, a substantially uniform comonomer distribution may refer to <8.0 wt %, <5.0 wt %, or <2.0 wt %. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

Figure 1B:
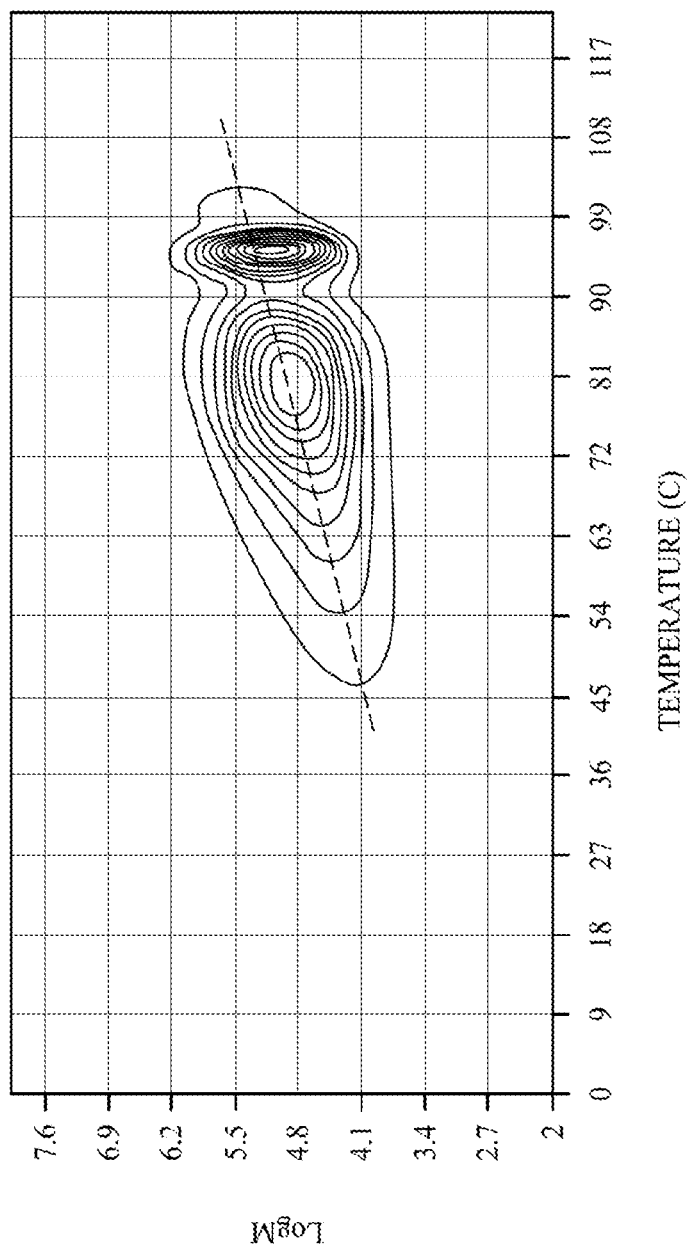

The TREF technique discussed in WO 2015/123164 A1 provides a measure of the bivariate mass distribution of the crystallized portion of such BOCD polyethylenes. A visual examination of the TREF contour plot is sufficient to confirm that the distribution is BOCD-like as opposed to the conventional-type, such as is shown in the graphs of FIGS. 1A and 1B. Such an evaluation consists of a non-quantitative method of ordering the polyethylene copolymers under consideration by increasing or decreasing BOCD-like character based on the "tilt" of the TREF contours in the 2D plane. For example, the slope of the line in FIG. 1A is less than 0 (negative "tilt") whereas the slope of the line in FIG. 1B is greater than 0 (positive "tilt"), and this allows one to conclude that the graph depicted by FIG. 1A has more BOCD-like character than the graph depicted by FIG. 1B. In particular, FIGS. 1A and 1B exemplify the "tilt" and "spread" in temperature elution fractionation (TREF) data of two LLDPEs: BOCD polyethylene (FIG. 1A) and conventional polyethylene (FIG. 1B), where the dashed, guide-to-the-eye lines roughly connect the two main peaks and are qualitative indicators of the tilt of the branching distribution; the slope of the line in FIG. 1A is less than 0 (negative tilt) whereas the slope of the line in FIG. 1B is greater than 0 (positive tilt). This aspect is described further in US 2017/0363605.

The BOCD polyethylene of the present disclosure comprises from about 70 mole percent (mol %) to about 100 mol % of units derived from ethylene. The lower amount on the range of ethylene content may be from 70 mol %, 75 mol %, 80 mol %, 85 mol %, 90 mol %, 92 mol %, 94 mol %, 95 mol %, 96 mol %, 97 mol %, 98 mol %, or 99 mol % based on the mol % of polymer units derived from ethylene. The BOCD polyethylene may have an upper ethylene amount of 80 mol %, 85 mol %, 90 mol %, 92 mol %, 94 mol %, 95 mol %, 96 mol %, 97 mol %, 98 mol %, 99 mol %, 99.5 mol %, or 100 mol %, based on polymer units derived from ethylene. For polyethylene copolymers, the BOCD polyethylene may have less than 50 mol % of polymer units derived from a $C_3$-$C_{20}$ olefin, preferably, an alpha-olefin, e.g., hexene or octene. The lower amount on the range of $C_3$-$C_{20}$ olefin-content may be 25 mol %, 20 mol %, 15 mol %, 10 mol %, 8 mol %, 6 mol %, 5 mol %, 4 mol %, 3 mol %, 2 mol %, 1 mol %, or 0.5 mol %, based on polymer units derived from the $C_3$-$C_{20}$ olefin. The upper amount on the range of $C_3$-$C_{20}$ olefin-content may be 20 mol %, 15 mol %, 10 mol %, 8 mol %, 6 mol %, 5 mol %, 4 mol %, 3 mol %, 2 mol %, or 1 mol %, based on polymer units derived from the $C_3$ to $C_{20}$ olefin. Any of the lower amounts may be combined with any of the upper amounts to form a range. Comonomer content is based on the total content of all monomers in the polymer.

In a class of embodiments, the BOCD polyethylene may have low amounts of long chain branching (i.e., less than 1.0 long-chain branch/1,000 carbon atoms, such as particularly 0.05 to 0.50 long-chain branch/1,000 carbon atoms). Such values are characteristic of a linear structure that is consistent with a branching index (as defined below) of $g'_{vis}$ 0.980 or greater, 0.985 or greater, 0.99 or greater, 0.995 or greater, or 1.0. While such values are indicative of little to no long chain branching, some long chain branches may be present (i.e., less than 1.0 long-chain branch/1,000 carbon atoms, such as less than 0.5 long-chain branch/1,000 carbon atoms, such as 0.05 to 0.50 long-chain branch/1,000 carbon atoms).

In any embodiment, the BOCD polyethylenes may have a density in accordance with ASTM D-4703 and ASTM D-1505/ISO 1183 of from 0.910 $g/cm^3$ to 0.925 $g/cm^3$, from 0.910 $g/cm^3$ to 0.923 $g/cm^3$, from 0.910 $g/cm^3$ to 0.920 $g/cm^3$, from 0.915 $g/cm^3$ to 0.921 $g/cm^3$, from 0.910 $g/cm^3$ to 0.918 $g/cm^3$, from 0.912 $g/cm^3$ to 0.918 $g/cm^3$, or from 0.912 $g/cm^3$ to 0.917 $g/cm^3$.

The weight average molecular weight (Mw) of the BOCD polyethylenes may be from 15,000 g/mol to 500,000 g/mol, from 20,000 g/mol to 250,000 g/mol, from 25,000 g/mol to 150,000 g/mol, from 150,000 g/mol to 400,000 g/mol, from 200,000 g/mol to 400,000 g/mol, or from 250,000 g/mol to 350,000 g/mol as determined by GPC.

The BOCD polyethylenes may have a molecular weight distribution (MWD) or (Mw/Mn) of from 1.5 to 5, from 2 to 4, from 3 to 4, or from 2.5 to 4.

The BOCD polyethylenes may have a z-average molecular weight (Mz) to weight average molecular weight (Mw) greater than 1.5, or greater than 1.7, or greater than 2. In any embodiment, this ratio is from 1.7 to 3.5, from 2 to 3, or from 2.2 to 3.

The BOCD polyethylenes may have a melt index (MI) or (12.16) as measured by ASTM D-1238-E (190° C./2.16 kg) of from 0.1 to 300 g/10 min, 0.1 to 100 g/10 min, 0.1 to 50 g/10 min, 0.1 g/10 min to 5 g/10 min, 0.1 g/10 min to 3 g/10 min, 0.1 g/10 min to 2 g/10 min, 0.1 g/10 min to 1.2 g/10 min, 0.2 g/10 min to 1.5 g/10 min, 0.2 g/10 min to 1.1 g/10 min, 0.3 g/10 min to 1 g/10 min, 0.4 g/10 min to 1 g/10 min, 0.5 g/10 min to 1 g/10 min, 0.6 g/10 min to 1 g/10 min, 0.7 g/10 min to 1 g/10 min, or 0.75 g/10 min to 0.95 g/10 min.

The BOCD polyethylenes may have a melt index ratio (MIR) (121.6/12.16) (as defined below) of from 10 to 50, from 15 to 45, from 20 to 40, from 20 to 35, from 22 to 38, from 20 to 32, from 25 to 31, or from 28 to 30.

In some embodiments, the BOCD polyethylenes may contain less than 5 ppm hafnium, less than 2 ppm hafnium, less than 1.5 ppm hafnium, or less than 1 ppm hafnium. In other embodiments, the BOCD polyethylenes may contain from 0.01 ppm to 2 ppm hafnium, from 0.01 ppm to 1.5 ppm hafnium, or from 0.01 ppm to 1 ppm hafnium.

Typically, the amount of hafnium is greater than the amount of zirconium in the BOCD polyethylene. In a particular class of embodiments, the ratio of hafnium to zirconium (ppm/ppm) is at least 2, at least 10, at least 15, at least 17, at least 20, at least 25, at least 50, at least 100, at least 200, or at least 500 or more. Since zirconium is generally present as an impurity in hafnium, it will be realized that hafnium-containing catalysts contain some amount of zirconium as an impurity. In any embodiment where particularly pure hafnium-containing catalysts are used, the amount of zirconium may be extremely low, resulting in an undetectable amount or a substantially undetectable amount of zirconium in the BOCD polyethylene. Thus, the upper limit on the ratio of hafnium to zirconium in the polymer may be quite large.

In several classes of embodiments, the BOCD polyethylenes may have at least a first peak and a second peak in a comonomer distribution analysis, wherein the first peak has a maximum at a log(Mw) value of from 4 to 5.4, 4.3 to 5, or 4.5 to 4.7; and a TREF elution temperature of 70° C. to 100° C., 80° C. to 95° C., or 85° C. to 90° C. The second peak in the comonomer distribution analysis has a maximum at a log(Mw) value of from 5 to 6, 5.3 to 5.7, or 5.4 to 5.6; and a TREF elution temperature of 40° C. to 60° C., 45° C. to 60° C., or 48° C. to 54° C.

In any of the embodiments described above, the BOCD Polyethylene may have one or more of the following properties: a melt index (MI) (190° C./2.16 kg) of from 0.1 g/10 min to 5 g/10 min; a melt index ratio (MIR) of from 15 to 30; an Mw of from 20,000 to 200,000 g/mol; a Mw/Mn of from 2 to 4.5; and a density of from 0.910 to 0.925 g/cm$^3$. In any of these embodiments, the amount of hafnium is greater than the amount of zirconium and a ratio of hafnium to zirconium (ppm/ppm) may be at least 2, at least 10, at least 15, at least 17, at least 20, or at least 25.

Materials and processes for making the BOCD polyethylene have been described in, for example, U.S. Pat. No. 6,956,088, particularly Example 1; U.S. Patent Application Publication No. 2009/0297810, particularly Example 1; U.S. Patent Application Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

One or more BOCD polyethylenes can be obtained commercially available from ExxonMobil Chemical Company, Houston, TX, and sold under Exceed XP™ metallocene polyethylene (mPE). Exceed XP™ mPE offers step-out performance with respect to, for example, dart drop impact strength, flex-crack resistance, and machine direction (MD) tear, as well as maintaining stiffness at lower densities. Exceed XP™ mPE also provides a good balance of melt strength, toughness, stiffness, and sealing capabilities which makes this family of polymers well-suited for, for example, blown film/sheet solutions.

Figure 2:
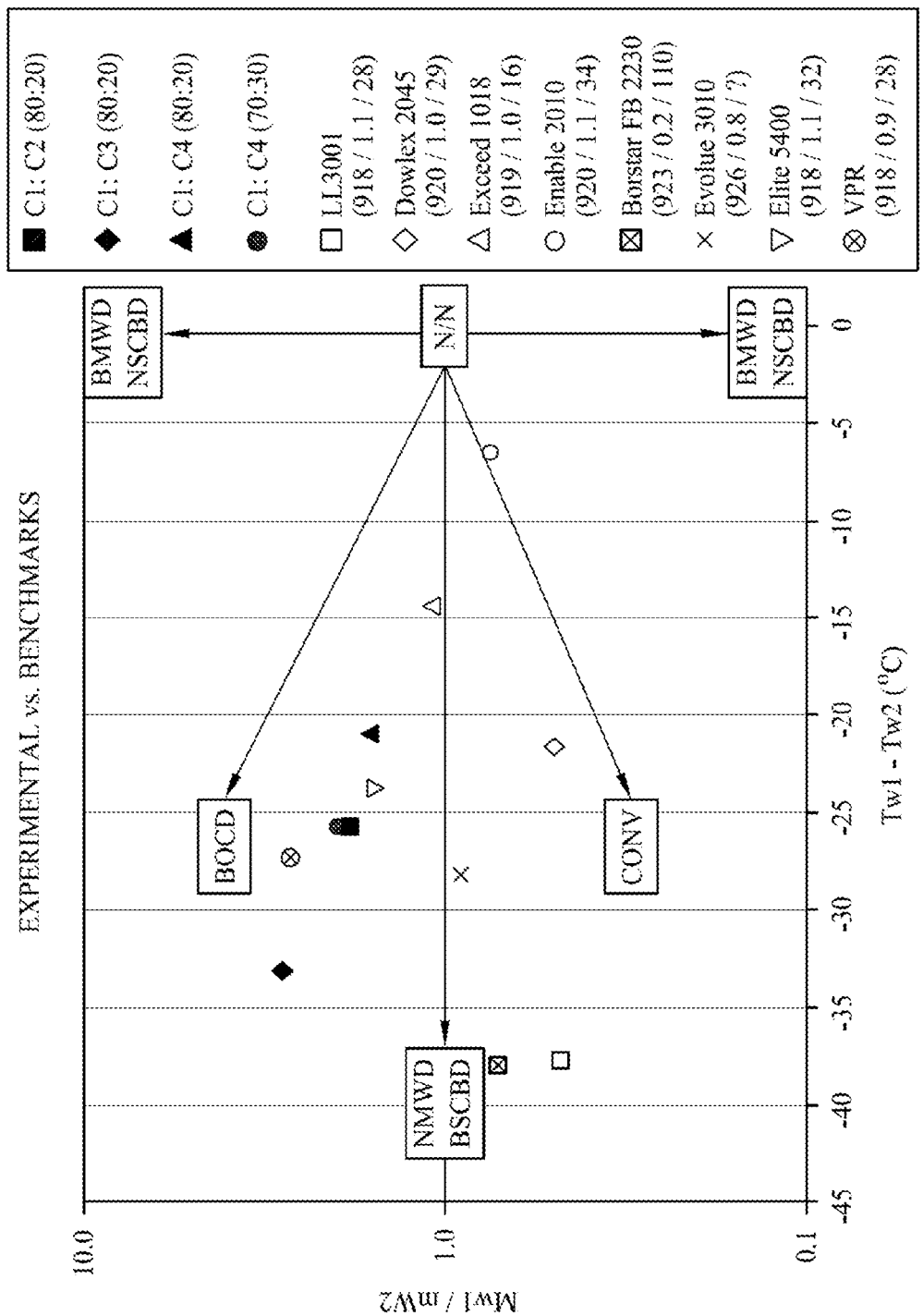
FIG. 2 is a plot of Compositional Distribution (molecular weight as a function of branching) plotting ($M_{W1}/M_{W2}$) values as a function of ($T_{W1}-T_{W2}$) for BOCD PE polymers and conventional PE polymer.

FIG. 2 is a plot of Compositional Distribution (molecular weight as a function of branching) plotting ($M_{W1}/M_{W2}$) values as a function of ($T_{W1}$-$T_{W2}$) for BOCD PE polymers and conventional PE polymer, according to any embodiment. The values for $T_{W1}$, $T_{W2}$, $M_{W1}$, and $M_{W2}$ can be determined from cross-fractionation chromatography (CFC), where the procedures for interpreting the data obtained from CFC and for determining the values for $T_{W1}$, $T_{W2}$, $M_{W1}$, and $M_{W2}$ are discussed in more detail in U.S. Pub. No. 2018/0155474, which is incorporated by reference for discussion on CFC and determining the values for $T_{W1}$, $T_{W2}$, $M_{W1}$, and $M_{W2}$. Among other information, this techniques helps to elucidate the level of comonomer on high-to-low molecular weight fractions of polyethylenes. Calculations are used to determine branching within the molecular weight fractions of polyethylenes.

Qualitatively, a gradient of molecular weight fractions of the polyethylene (a gradient based on both molecular weight of individual polymer chains and the level of branching on each chain) elutes from at least one temperature-gradient gel permeation chromatographic column at a gradient of temperatures and molecular weights, where 50 wt % or less of the cumulative molecular weight polyethylene fractions elutes at a temperature $T_{W1}$, and greater than 50 wt % cumulative molecular weight polyethylene fractions elute at a temperature $T_{W2}$, the molecular weight fractions eluting at $T_{W1}$ being a molecular weight component $M_{W1}$ and the fractions eluting at $T_{W2}$ being a molecular weight component $M_{W2}$.

Quantitatively, to calculate values of $T_{W1}$, $T_{W2}$, $M_{W1}$, and $M_{W2}$, the data obtained from fractional CFC is divided into two roughly equal halves, hence, this analysis is sometimes referred to as the Equal Halves Analysis. For each half, the $T_{Wi}$ and $T_{Wi}$ for each fraction "i" is calculated according to the conventional definition of weight average. Fractions which do not have sufficient quantity (<0.5 wt %) to be processed for molecular weight averages in the original data file are excluded from the calculation of $T_{W1}$, $T_{W2}$, $M_{W1}$, and $M_{W2}$.

FIG. 2 is a semi-log plot of ($M_{W1}/M_{W2}$) as a function of ($T_{W1}$-$T_{W2}$) designed to show the important differences in MWD/short chain branching distribution (SCBD) combination among examples compared to commercial benchmarks. Such differences are believed to play a key role in determining the trade-off pattern and/or balance of various performance attributes such as stiffness, toughness and processability. The polyethylenes are above the mid-horizontal line, while conventional polyethylenes having typical short-chain branching distribution (SCBD) are below the mid-line. Also in FIG. 2, the narrow short chain branching distribution (NSCBD) region of the plot is highlighted along with the broad short chain branching distribution (BSCBD) region. The polyethylenes are in-between the extremes, represented by an $M_{W1}/M_{W2}$ value of between 0.9 and 10, more preferably 1.5 and 5.

In the plot of FIG. 2, SCBD and MWD are described together. That is, the combination of molecular weight characteristic and SCB of a particular population is highlighted, rather than the Mw or SCB separately. Therefore, between the NSCBD extreme (far right vertical line) and BSCBD extreme (far left vertical line, not center line) is described a region of the plot. There are two further divisions to set different polyethylene product concepts apart an upper half above and a lower half below the center line in the plot of FIG. 2. The upper half above the center line in the plot of FIG. 2 is where the BOCD polyethylenes are located, that is, the combination of Low Mw/High Tw (low SCB, high density) population with High Mw/Low Tw (high SCB, low density) population. The lower half below the center line in the plot of FIG. 2 is what is typically called "conventional" (Ziegler-Natta-like), that is, the combination of High Mw/Low Tw (low SCB, low density) population with Low Mw/High Tw (high SCB, high density) population.

The lower half below the center line in FIG. 2 is what is typically called "conventional" (Ziegler-Natta-like), that is, the combination of High Mw/Low Tw (low SCB, low density) population with Low Mw/High Tw (high SCB, high density) population. The measurements are summarized in Table 3 of U.S. Pub. No. 2018/0155474, where the following are comparative examples:

Dowlex™ 2045 polyethylene obtained from the Dow Chemical Company (Midland, MI).

Borstar™ FB2230 polyethylene obtained from Borealis AG (Austria).

Evolve™ 3010 polyethylene from Mitsui Chemical Company (Japan).

Elite™ 5400 polyethylene obtained from The Dow Chemical Company (Midland, MI).

Exceed™ 1018 and Enable™ 2010 polyethylenes are obtained from ExxonMobil Chemical Company (Baytown, TX).

LL3001 polyethylene is obtained from ExxonMobil Chemical Company (Baytown, TX).

VPR is a polyethylene made in a metallocene gas phase process as described in PCT/US2015/015119 (Polymer 1-10, Table 1).

In any embodiment, the BOCD polyethylene has an $M_{W1}/M_{W2}$ of greater than 1, such as from about 1.2, about 1.5, about 1.8, about 2, about 2.5, about 3, about 3.5, or about 4 to about 4.5, about 5, about 5.5, about 6, about 7, about 8, about 9, or about 10. For example, the BOCD polyethylene has an $M_{W1}/M_{W2}$ of greater than 1 to about 10, greater than 1 to about 8, greater than 1 to about 7, greater than 1 to about 6, greater than 1 to about 5, greater than 1 to about 4, greater than 1 to about 3, about 1.5 to about 10, about 1.5 to about 8, about 1.5 to about 7, about 1.5 to about 6, about 1.5 to about 5, about 1.5 to about 4, about 1.5 to about 3, about 2 to about 10, about 2 to about 8, about 2 to about 7, about 2 to about 6, about 2 to about 5, about 2 to about 4, or about 2 to about 3.

The BOCD polyethylene has a $T_{w1}-T_{w2}$ of less than 0° C., such as from about −1° C., about −5° C., about −10° C., about −15° C., or about −20° C. to about −25° C., about −30° C., about −35° C., about −40° C., or about −45° C. The BOCD polyethylene has a $T_{W1}-T_{W2}$ of less than 0° C. to about −45° C., less than 0° C. to about −40° C., less than 0° C. to about −35° C., less than 0° C. to about −25° C., less than 0° C. to about −20° C., less than 0° C. to about −15° C., less than 0° C. to about −10° C., −5° C. to about −45° C., −5° C. to about −40° C., −5° C. to about −35° C., −5° C. to about −25° C., −5° C. to about −20° C., −5° C. to about −15° C., −5° C. to about −10° C., −10° C. to about −45° C., −10° C. to about −40° C., −10° C. to about −35° C., −10° C. to about −25° C., −10° C. to about −20° C., or −10° C. to about −15° C.

Polypropylenes

Compositions of the present disclosure include one or more polypropylenes. The "polypropylene" is a polymer that contains at least 50 mol % propylene-derived units. The polypropylene can have less than 50 mol % of polymer units derived from ethylene and/or one or more $C_4$ to $C_{20}$ olefins, such as, an alpha-olefin, for example, hexene or octene. The concentration of the ethylene and/or one or more $C_4$ to $C_{20}$ olefins be 45 mol %, 40 mol %, 35 mol %, 30 mol %, 25 mol %, 20 mol %, 15 mol %, 10 mol %, 8 mol %, 6 mol %, 5 mol %, 4 mol %, 3 mol %, 2 mol %, 1 mol %, or 0.5 mol %, based on polymer units derived from the ethylene and/or one or more $C_4$ to $C_{20}$ olefins. Comonomer content is based on the total content of all monomers in the polymer. Desirable polypropylenes include homopolymers, copolymers (random or block) comprising from 0.2, or 0.5 wt % comonomer derived units to 10, or 15, or 20 wt % comonomer derived units, terpolymers comprising at least 50 wt % propylene derived units, impact copolymers (a blend of a homopolymer and copolymer), and blends thereof.

In one or more examples, the polypropylene can be or include a base or reactor grade polypropylene. In some examples, the polypropylene can be or include one or more high melt strength polypropylenes (HMS PPs) and/or one or more trimmed polypropylenes (tPPs). The tPP contains and/or is produced from one or more HMS PPs, as described and discussed herein.

As used herein, the terms "trim," "trimmed," and "trimming" refer to the reduction, either chemically or by dilution, of the high molecular weight tail of a polymer, which is manifest by a reduction of the z-average molecular weight of the polymer, independently and relative to the number average and weight average molecular weight. In one or more examples, the terms "trim," "trimmed," and "trimming" can refer to chemical reduction.

As used herein, a "film" is a solid flexible material that may take on any desirable two-dimensional length and width and have an average thickness within the range of from 10 μm or 20 μm or 30 μm or 40 μm to an upper limit of 50 μm or 60 μm or 80 μm or 100 μm or 150 μm or 200 μm or 300 μm, or 400 μm, or 500 μm, wherein the length and width of the film is much greater than its thickness. Thus, an exemplary average thickness of a film is within the range of from 10 μm to 60 μm.

A "multi-layered film" as used herein comprises two or more layers, and may comprise 3, 4, 5, 6, or more layers in any embodiment, and may have a combined thickness of up to 1000, or 1500, or 2000, or 2500 μm. The term "film" also includes the possibility of coatings, such as when the film is extruded onto a surface such as a metal, glass, another polymer, or other stiff or flexible surface.

As used herein, the term "layer" refers to each of the one or more materials, the same or different, that are secured to one another in the form of a thin sheet or film by any appropriate means such as by an inherent tendency of the materials to adhere to one another, or by inducing the materials to adhere as by a heating, radiative, chemical, or some other appropriate process. A layer is not limited to detectable, discrete materials contacting one another such that a distinct boundary exists between the materials. Preferably, however, the materials used to make one layer of a film will be different (i.e., the weight percent of components, the properties of each component, and/or the identity of the components may differ) from the materials used to make an adjacent, and adhering, layer. A layer includes a finished product having a continuum of materials throughout its thickness.

Trimming of an HMS PP can occur by either chemical treatment with a long half-life organic peroxide, by physical dilution with a narrow molecular weight distribution (MWD) polypropylene, or a combination of the two. In any embodiment, the HMS PP's described herein are trimmed only by treatment with a long-half-life organic peroxide. In any embodiment, a process to prepare a tPP includes combining an HMS PP containing at least 50 mol % of propylene, and having a molecular weight distribution (Mw/Mn) greater than 6, a branching index ($g'_{vis}$) of at least 0.95, and a melt strength of at least 20 cN determined using an extensional rheometer at 190° C., with (i) from about 20 ppm to about 1,000 ppm of a long half-life organic peroxide; and/or (ii) from about 20 wt % to about 70 wt % of a narrow MWD polypropylene containing at least 50 mol % of propylene, and having a molecular weight distribution (Mw/Mn) of less than 6, and isolating a trimmed polypropylene. Other properties of the starting HMS PP, and the tPP will be described below.

In any embodiment, the tPP contains at least 50 mol % of propylene and has a molecular weight distribution (Mw/Mn) of less than 22, 20, 18, 16, or 15, or from about 5, about 6, about 7, about 7.5, about 8, about 8.5, or about 9 to about 15, about 16, about 18, about 20, or about 22; a z-average molecular weight of less than 2,500,000 g/mol, 2,000,000 g/mol, 1,600,000 g/mol, 1,400,000 g/mol, or 1,200,000 g/mol, or from about 500,000 g/mol, about 600,000 g/mol, or about 800,000 g/mol to about 1,200,000 g/mol, about 1,400,000 g/mol, or about 1,600,000 g/mol; a branching index ($g'_{vis}$) of at least 0.95; and a melt strength less than 20 cN (e.g., from about 1 cN to about 15 cN) as determined using an extensional rheometer at 190° C. Other properties of the tPP will be described below.

By diluting the concentration of the high molecular weight chains in polymers such as an HMS PP having a high molecular weight component or "tail," such as by blending the HMS PP with a narrow MWD homopolymer PP, it has been discovered that the film quality can improve without surface/bulk irregularity at commercial rates of film formation of at least 13 lb/hr/in. It has been discovered that the concentration of high molecular weight tail can be reduced by addition of low levels of peroxides that have relatively "long" half-lives (e.g., Luperox™ 101, Triganox™ 101). Using this approach, the film quality of a film containing HMS PP can improve without surface/bulk irregularity at the commercial rates of film formation of at least 13 lb/hr/in.

High Melt Strength Polypropylenes (HMS PP)

The tPPs, and films (or coatings) therefrom, derive from a polypropylene having a relatively high Melt Strength (greater than 15 cN, or 20 cN), referred to herein simply as a "high melt strength polypropylene" (or HMS PP) having one or more features as described here, made according to the disclosure in WO 2014/070386. In any embodiment, the HMS PP contains at least 50 mol %, about 60 mol %, about 70 mol %, about 80 mol %, or 90 mol % propylene-derived monomer units, or from about 50 mol %, about 60 mol %, or about 80 mol % to about 95 mol %, about 97 mol %, or about 99 mol % propylene-derived units, the remainder being a comonomer selected from ethylene and $C_4$ to $C_{20}$ α-olefins, for example, ethylene or 1-butene. In any embodiment, the HMS PP is a homopolymer of propylene-derived monomer units.

In any embodiment, the HMS PP has an isotactic pentad percentage of greater than 90%, 92%, or 95% as determined by $^{13}C$ NMR spectroscopy. Also, the HMS PP has a melt flow rate (MFR) from about 0.1, about 1, or about 2 g/10 min to about 12, about 16, about 20, or about 40 g/10 min, as determined according to ASTM D1238 Condition L (230° C./2.16 kg).

In any embodiment, the HMS PP has a weight average molecular weight (Mw) from about 200,000 g/mol, about 300,000 g/mol, or about 350,000 g/mol to about 500,000 g/mol, about 600,000 g/mol, or about 700,000 g/mol; a number average molecular weight (Mn) from about 15,000 g/mol or about 20,000 g/mol to about 30,000 g/mol, about 35,000 g/mol, or about 40,000 g/mol; and/or a z-average molecular weight from about 900,000 g/mol, about 1,000,000 g/mol, or about 1,200,000 g/mol to about 1,800,000 g/mol, about 2,000,000 g/mol, or about 2,200,000 g/mol, as determined by Size Exclusion Chromatograph ("SEC"). In any embodiment, the HMS PP has a molecular weight distribution (Mw/Mn) of greater than 6, 7, or 8; or from about 6, about 7, about 8, about 10, or about 12 to about 14, about 16, about 18, about 20, or about 24. In any embodiment, the HMS PP has an Mz/Mw of greater than 3, 3.4, or 3.6, or from about 3, about 3.4, or about 3.6 to about 3.8, about 4, or about 4.4. The HMS PP can have a Mz/Mn of greater than 35, 40, 55, or 60, or from about 35, about 40, or about 55 to about 60, about 65, about 70, about 75, or about 80. Polymer molecular weight (weight-average molecular weight, Mw, number-average molecular weight, Mn, and z-averaged molecular weight, Mz) and molecular weight distribution (Mw/Mn) are determined using SEC. Equipment includes of a High Temperature Size Exclusion Chromatograph (either from Waters Corporation or Polymer Laboratories), with a differential refractive index detector (DRI) or infrared (IR) detector.

The HMS PPs can be linear as evidenced by a high branching index. In any embodiment, the HMS PPs have a branching index (g', also referred to in the literature as $g'_{vis\ avg}$) of at least 0.95, 0.97, or 0.98, as determined in column 37 of U.S. Pat. No. 7,807,769 determined by using a High Temperature Size Exclusion Chromatograph (either from Waters Corporation or Polymer Laboratories), equipped with three in-line detectors, a differential refractive index detector (DRI), a light scattering (LS) detector, and a viscometer.

In any embodiment, the HMS PPs can have a melt strength of at least 15 cN or 20 cN determined using an extensional rheometer at 190° C.; or from about 10 cN, about 15 cN, or about 20 cN to about 35 cN, about 40 cN, about 60 cN, about 80 cN, or about 100 cN.

In any embodiment, the HMS PPs have a viscosity ratio from about 35 to about 80 determined from the complex viscosity ratio at 0.01 to 100 rad/s angular frequency at a fixed strain of 10% at 190° C. Also in any embodiment, the HMS PP has a Peak Extensional Viscosity (annealed) from about 10 kPa·s or about 20 kPa·s to about 40 kPa·s, about 50 kPa·s, about 55 kPa·s, about 60 kPa·s, about 80 kPa·s, or about 100 kPa·s at a strain rate of 0.01/sec (190° C.).

In any embodiment, the HMS PP has a heat distortion temperature of greater than or equal to 100° C., determined according to ASTM D648 using a load of 0.45 MPa (66 psi). In some embodiments, the HMS PP has a Modulus from about 1,800 MPa or about 2,000 MPa to about 2,400 MPa or about 2,500 MPa, determined according to ASTM D790A on nucleated samples with 0.01 to 0.1 wt % α-nucleating agent.

The HMS PPs can have a peak melting point temperature (second melt, $Tm_2$) of greater than 160° C. or 164° C., or from about 160° C. or about 164° C. to about 168° C. or about 170° C. (by DSC); and a crystallization temperature (Tc) of greater than 100° C., 105° C., or 110° C., or from about 100° C., about 105° C., or about 110° C. to about 115° C. or about 120° C. (by DSC).

In any embodiment, the HMS PPs used to make the tPPs and films therefrom are a reactor-grade material, meaning that HMS PP is used as it comes out of the reactor used to produce it, optionally having been further made into pellets of material that has not altered any of its properties such as the branching index, MWD, or melt flow rate by more than 1% of its original value. In any embodiment, the HMS PP has not been cross-linked or reacted with any radiation or chemical substance to cause cross-linking and/or long-chain branching. Typical forms of radiation known to cause cross-linking and/or long-chain branching include use of so-called e-beams or other radiation (beta or gamma rays) that interact with the polymer. Exemplary HMS PP's that are commercially available are Achieve™ Advanced polypropylene grades from ExxonMobil Chemical Company (Houston, TX).

Process to Produce the Trimmed Polypropylene

As stated above, the process to prepare the tPP can include combining the HMS PP with either a long half-life organic peroxide, a narrow MWD polypropylene, or a combination thereof. The long half-life organic peroxide is combined with the HMS PP such that it is from about 20 ppm, about 25 ppm, or about 50 ppm to about 400 ppm, about 600 ppm, about 800 ppm, or about 1,000 ppm of a long half-life organic peroxide based on the weight of the peroxide, the HMS PP, and any other additives. By "long half-life organic peroxide," what is meant is an organic peroxide (a peroxide-containing hydrocarbon) having a 1 hour half-life temperature ($^1t_{1/2}$) of greater than 100° C., or 110° C., or 120° C., or 130° C., as measured in $C_6$ to $C_{16}$ alkane such as dodecane or decane, or a halogenated aryl compound such as chlorobenzene.

Such peroxides can include those having the general structure $R^1$—OO—$R^2$, or $R^1$—OO—$R^3$—OO—$R^2$, or, more generally, $(R^1$—OO—$R^2)_n$, where "n" is an integer from 1 to 5; and wherein each of $R^1$ and $R^2$ are independently selected from $C_2$ to $C_{10}$ alkyls, $C_6$ to $C_{12}$ aryls, and $C_7$ to $C_{16}$ alkylaryls, such as iso- or tertiary-alkyls, and $R^3$ is selected from $C_1$ to $C_6$, or $C_{10}$ alkylenes, $C_6$ to $C_{12}$ aryls, and $C_7$ to $C_{16}$ alkylaryls; the "—OO—" being the peroxide moiety. Long half-life organic peroxides may be 2,5-dimethyl-2,5-di(tert-butylperoxy)hexane, 2,5-bis(tert-butylperoxy)-2,5-dimethylhexane, di-tertbutyl peroxide, or dicumyl peroxide.

The half-life is determined by differential scanning calorimetry-thermal activity monitoring of a dilute solution of the initiator in a suitable solvent. The half-life can then be calculated from the Arrhenius plot as is well known in the art. Thus, by treating the HMS PP, having a large amount of a high molecular weight component or "tail", with the long half-life peroxide the high molecular weight component is reduced or "trimmed". The appropriate solvent is determined based on the solubility of the organic peroxide.

Alternatively, or additionally, the HMS PP can be trimmed by combining from about it) 20 wt % or about 30 wt % to about 50 wt %, about 60 wt %, or about 70 wt %, by weight of the combined components, of a "narrow MWD polypropylene". The narrow MWD polypropylene contains at least 50 mol %, 60 mol %, 70 mol %, 75 mol %, or 80 mol % of propylene, and has an MWD of less than 6, or 5, or 4, or from about 2, or about 2.5 to about 4, or about 5, or about 6. In any embodiment, the MFR of the narrow MWD polypropylene is from about 4 g/10 min or about 8 g/10 min to about 40 g/10 min, about 60 g/10 min, about 80 g/10 min, or about 100 g/10 min. The narrow MWD polypropylene can be a propylene polymer having at least 50 mol % of propylene-derived units, such as those containing from about 0.1 wt % to about 5 wt % of comonomers such as ethylene-derived units, for example, homopolymers of propylene, such as isotactic polypropylenes. Thus, the high molecular weight component of the HMS PP can be diluted or "trimmed" using this technique. The "trimming" includes combining the HMS PP and narrow MWD polypropylene by melt blending as is known in the art, such as through one or two passes through an extruder, such as described in the "two-pass" process of WO 2016053468A1.

In any embodiment, the "combining" of the HMS PP and the long half-life organic peroxide can be performed by melt blending at least the peroxide and HMS PP at the melting temperature of the HMS PP, such as at a temperature of at least 120° C., about 130° C., about 150° C., or about 160° C., for example at a temperature from about 120° C., about 130° C., about 140° C., about 150° C., or about 160° C. to about 220° C., about 240° C., about 260° C., about 280° C., or about 300° C., such temperature being the melt temperature as measured by a thermocouple in the melt upon extrusion from the mixing apparatus used to combine the materials. In some examples, the melt temperature of any melt including the HMS PP is from about 245° C., or about 250° C. to about 260° C. At such temperatures the long half-life organic peroxides are activated towards beta-scissioning of the polypropylene and at the low concentrations used to achieve the trimming, the amount and combining temperature being tailored to the level of trimming for the particular HMS PP. The combining can take place in a single-screw or twin-screw extruder which can have controlled heating capability. This process can take place to form pellets of tPP, or in-line with the film making equipment or other desirable end-use making equipment such as thermoforming or blow molding.

The Trimmed Polypropylene (tPP)

The process of combining the long half-life organic peroxide with the HMS PP leads to the tPPs. The starting polypropylenes used to make the tPPs typically have a large amount of high molecular weight polymer chains, typically above the critical orientation level. When making certain articles such as films, this can lead to strong films, but with many surface defects and thus unusable for most applications. It has been discovered that if some of the high molecular weight component is reduced or removed, trimmed, the resulting tPP has certain desirable properties, but maintains other desirable properties.

In any embodiment, the melt strength (measured at 190° C. as described herein) of the tPPs is less than 20 cN, 15 cN, or 10 cN, or from about 1 cN or about 2 cN to about 4 cN, about 6 cN, about 10 cN, about 15 cN, or about 20 cN. The crystallization temperature Tc (as measured by DSC) of the tPP is greater than 114° C., 115° C., or 116° C.; or from about 114° C., about 115° C., or about 116° C. to about 120° C., about 122° C., or about 124° C. The second peak melting temperature $Tm_2$ (as measured by DSC) of the tPP is greater than 157° C., or 158° C., or 159° C., or from about 157° C., about 158° C., or about 159° C. to about 166° C., about 167° C., about 168° C., or about 169° C.

In any embodiment, the tPPs have a branching index (g', also referred to in the literature as $g'_{vis\ avg}$) of at least 0.95, 0.97, or 0.98. The tPPs have molecular weight features distinct from the HMS PP from which they are derived. In any embodiment, the z-average molecular weight of the tPP is less than 2,500,000 g/mol, 2,000,000 g/mol, 1,600,000 g/mol, 1,400,000 g/mol, or 1,200,000 g/mol, or from about 500,000 g/mol, about 600,000 g/mol, or about 800,000 g/mol to about 1,200,000 g/mol, about 1,400,000 g/mol, about 1,600,000 g/mol, about 2,000,000 g/mol, or about 2,500,000 g/mol. The Mz/Mn value of the tPP is less than 60, 55, or 40, or from about 10, about 15, about 20, or about 25 to about 35 about 40, about 55, or about 60. The Mz/Mw value of the tPP is less than 4, 3.8, or 3.6, or from about 2.5 or about 2.6 to about 3.6, about 3.8, or about 4. The tPPs have a molecular weight distribution (Mw/Mn) of less than 22, 20, 18, 16, or 15, or from about 5, about 6, about 7, about 7.5, about 8, about 8.5, or about 9 to about 15, about 16, about 18, about 20, or about 22.

In any embodiment, the tPPs have an MFR (2.16 kg/230° C.) from about 0.2 g/10 min, about 0.5 g/10 min, about 1 g/10 min, about 2 g/10 min, or about 3 g/10 min to about 4 g/10 min, about 5 g/10 min, about 6 g/10 min, about 8 g/10 min, about 10 g/10 min, or about 20 g/10 min. For example, the MFR of the tPPs is from about 0.2 g/10 min to about 20 g/10 min, about 0.5 g/10 min to about 15 g/10 min, about 0.5 g/10 min to about 10 g/10 min, about 0.5 g/10 min to about 8 g/10 min, about 0.5 g/10 min to about 5 g/10 min, about 0.5 g/10 min to about 4 g/10 min, about 0.5 g/10 min to about 3 g/10 min, or about 0.5 g/10 min to about 2 g/10 min. The tPPs can have elasticity while in the melt phase. In any embodiment, the Tan Delta (ratio of the viscous modulus (G") to elastic modulus (G') which is a useful quantifier of it) the presence and extent of elasticity in the melt) of the trimmed polypropylene is greater than 4, 6, 8, or 10, or from about 4, about 6, about 8, or about 10 to about 20, about 24, about 28, about 32, or about 36.

The tPPs also have advantageous bulk-physical properties. In any embodiment, the tPP has a Modulus of greater than 13 MPa, 14 MPa, or 15 MPa, or from about 13 MPa, about 14 MPa, or about 15 MPa to about 18 MPa, about 20 MPa, about 22 MPa, or about 24 MPa. In any embodiment, as with the base HMS PP, the reaction product of multifunctional monomers (e.g., polyfunctional acrylates) or oligomers (e.g., polyisobutylene), or cross-linking agents (e.g., silanes, siloxanes) are absent from the tPPs.

In any embodiment, the polypropylene, contained in the polyolefin composition, includes one or more tPPs which are produced from one or more HMS PPs. The polypropylene has a molecular weight distribution (Mw/Mn) of about 7 to about 22 and a z-average molecular weight of less than 2,500,000 g/mol. The polypropylene also has a branching index ($g'_{vis}$) of 0.95 or greater and a melt strength of less than 20 cN determined using an extensional rheometer at 190° C. Exemplary tPP's that are commercially available are Achieve™ Advanced polypropylene grades from ExxonMobil Chemical Company (Houston, TX).

Additives and Other Polymers

In some embodiments, other "additives" may also be present in the polyolefin composition, layers, and/or films thereof. These additives may be added before, during, and/or after the formation of the coextruded sheets or films. Such additives include antioxidants (e.g., hindered phenol- and phosphite-type compounds), stabilizers such as lactone and vitamin E, nucleators (both α-nucleators and β-nucleators), clarifying agents, colorants (dyes or pigments), fillers (silica or talc), UV stabilizers, release agents, slip agents, tackifiers, anti-static agents, acid scavengers (e.g., calcium stearate), anti-blocking agents, anti-blooming agents, polymer processing aid masterbatch (PPA MB) additives/agents, hydrocarbon resins such as Oppera™ type resins, or combinations thereof.

In any embodiment, the polyolefin composition, the core layer, and/or one or more skin layers contains one or more additives in an amount from about 0.5 wt %, about 1 wt %, about 2 wt %, about 3 wt %, about 4 wt %, or about 5 wt % to about 6 wt %, about 8 wt %, or about 10 wt %, based on the weight of the composition/layer. For example, the polyolefin composition contains from about 0.5 wt % to about 10 wt %, about 0.5 wt % to about 8 wt %, about 0.5 wt % to about 5 wt %, about 0.5 wt % to about 3 wt %, about 0.5 wt % to about 2 wt %, about 0.5 wt % to about 1 wt %, about 1 wt % to about 10 wt %, about 1 wt % to about 8 wt %, about 1 wt % to about 5 wt %, about 1 wt % to about 3 wt %, or about 1 wt % to about 2 wt % of the additive. In other embodiments, the polyolefin composition, the core layer, and/or one or more skin layers contains one or more additives in an amount from about 50 ppm, about 100 ppm, about 150 ppm, about 200 ppm, about 300 ppm, about 350 ppm, about 400 ppm, about 420 ppm, about 450 ppm, about 500 ppm, about 750 ppm, or about 1,000 ppm to about 1,500 ppm, about 2,000 ppm, about 2,500 ppm, about 3,000 ppm, about 4,000 ppm, about 4,500 ppm, or about 5,000 ppm. For example, the polyolefin composition, the core layer, and/or one or more skin layers contains about 50 ppm to about 5,000 ppm, about 100 ppm to about 5,000 ppm, about 150 ppm to about 5,000 ppm, about 200 ppm to about 5,000 ppm, about 300 ppm to about 5,000 ppm, about 420 ppm to about 5,000 ppm, about 500 ppm to about 5,000 ppm, about 1,000 ppm to about 5,000 ppm, about 1,500 ppm to about 5,000 ppm, about 2,000 ppm to about 5,000 ppm, about 2,500 ppm to about 5,000 ppm, about 3,000 ppm to about 5,000 ppm, about 50 ppm to about 3,000 ppm, about 100 ppm to about 3,000 ppm, about 150 ppm to about 3,000 ppm, about 200 ppm to about 3,000 ppm, about 300 ppm to about 3,000 ppm, about 420 ppm to about 3,000 ppm, about 500 ppm to about 3,000 ppm, about 1,000 ppm to about 3,000 ppm, about 1,500 ppm to about 3,000 ppm, about 2,000 ppm to about 3,000 ppm, or about 2,500 ppm to about 3,000 ppm of the additive.

In any embodiment, nucleating agents are absent, for example, α-nucleating agents are absent, meaning nucleating agents are not added to the composition or any components of the composition at any stage of the process of formation. Examples of α-nucleating agents include salts of monocarboxylic acids and polycarboxylic acids, sorbitols such as dibenzylidenesorbitol, salts of diesters of phosphoric acid, vinylcycloalkane polymers, or combinations thereof.

The polyolefin compositions of the present disclosure are particularly useful in films and articles that include films or film coatings. Films of less than 250 µm average thickness can be made using the polyolefin compositions and can contain any number of layers, such as additional layers of LLDPE, HDPE, LDPE, iPP, EP copolymers, and combinations thereof. Also, the polyolefin compositions can contain a composition including any of these polymers or combinations of polymers and be present in any desirable amount. Furthermore, sheets having an average thickness of about 250 µm or more can be made using the polyolefin compositions described herein, or may contain one or more layers containing polyolefin compositions and another material such as linear low-density polyethylene (LLDPE), HDPE, LDPE, iPP, EP copolymers, and combinations thereof. Such sheets, or other desirable structures made using the polyolefin compositions described herein, may be thermoformed, blow molded, or injection molded into useful articles, and further, polyolefin compositions may be rotomolded to form useful articles.

In any embodiment, the polyolefin composition, the core layer, the tie layer, and/or the skin layer can include one or more LLDPEs. The LLDPE is in a concentration of from about 5 wt %, about 10 wt %, about 15 wt %, about 20 wt % to about 25 wt %, about 30 wt %, about 40 wt %, or about 50 wt % by weight of the overall polymer composition (e.g., the polyolefin composition, the core layer, or the skin layer).

In some examples, the LLDPE contains ethylene derived units and comonomers selected from $C_3$ to $C_{10}$ alpha-olefin derived units.

The various descriptive elements and numerical ranges disclosed herein for the polyolefin compositions and methods of forming the polyolefin compositions and films therefrom can be combined with other descriptive elements and numerical ranges to describe the embodiments; further, for a given element, any upper numerical limit can be combined with any lower numerical limit described herein, including the examples.

Films Formed from the Polyolefin Compositions

Many articles can be formed from the polyolefin compositions described herein such as thermoformed articles, blow molded articles, injection molded articles, sheets, fibers, fabrics, and other useful items. For example, the polyolefin compositions can be used to produce industrial and food package articles that have a PP/PE film structure. The polyolefin compositions can be formed into films using any suitable method, especially cast films, extrusion coated films, and blown films, and/or included as at least part of one or more layers of a multi-layered film. Such types of films may have two, three, four or more layers represented such as S/C, S/C/S, S/C/C, S/T/C/S, S/T/C/T/S, wherein "C" is a core layer, "T" is a tie-layer, and "S" is a skin layer, each of which may be made from the same or different materials. Any one or more layers (e.g., core, tie, and/or skin layers) can contain or comprise, consist essentially of, or consist of one or more polyolefin compositions. In some examples, structures include those that contain a layer having a range from about 50 wt %, about 55 wt %, or about 60 wt % to about 80 wt %, about 85 wt %, or about 90 wt %, based on weight of the components of that layer, of one or more polyolefin compositions. In other examples, that layer is a core layer with at least one skin layer containing a polyethylene and/or polypropylene. The polyolefin compositions can replace the HDPE in many known film structures and allow down-gauging by about 10% to about 30% relative to when HDPE is used.

The polyolefin compositions can be used in making blown films. In a typical blown film process the ingredients used to form the film are added in any desirable form, such as granules, into a hopper which feeds the material to an extruder, where the materials are melt blended at a desirable temperature through shear forces and/or heating. The molten material is then fed, with or without filtering, to a die which may have just one, or have multiple cavities corresponding to each of multiple layers that will form the film. The die is also heated to a desired temperature and then forced from the die in a direction away from the die. The cooling of the forming film takes place via a device that blows air or one or more other gases (e.g., nitrogen, argon, mixtures thereof) that is at least 5° C. or 10° C. cooler than the surrounding air, where the "surrounding air" is air that is at least 1 meter from the cooling device, but less than 5 meters. For example, the air can blow against the outside of the film, such as around the entire circumference formed by the film. There is also air blown internally that both cools and blows the film up like a bubble/balloon. The film starts to expand where the film eventually cools and crystallizes to form a blown film. Conventional polypropylenes can be difficult to use for blown film processes because they typically have low melt strength, which will promote breakage of the bubble, balloon, or film. However, HMS PP of the present disclosure can provide improved melt strength for improved polypropylene-based blown film processes. In addition, the polyolefin compositions of the present disclosure have an enhanced toughness and a greater stiffness compared to conventional BOCD polyethylenes The performance of the compositions containing the polypropylenes being formed into a film can be characterized by its Maximum Die Rate. The "Maximum Die Rate" is a normalized extrusion rate by die size which is commonly used in the blown film industry. The Maximum Die Rate as used herein is expressed as follows: Maximum Die Rate [1b/in-hr]=Extrusion Rate [1b/hr]/Die Circumference [inch]. Another definition of the Maximum Die Rate is expressed as follows: Maximum Die Rate [kg/mm-hr]=Extrusion Rate [kg/hr]/Die Diameter [mm]. The Maximum Die Rate at which the film is formed is greater than 13 lb/in-hr (0.73 kg/mm-hr) or 16 lb/in-hr (0.90 kg/mm-hr) or 24 lb/in-hr (1.34 kg/mm-hr), or from 13 lb/in-hr (0.73 kg/mm-hr) or 16 lb/in-hr (0.90 kg/mm-hr), or 24 lb/in-hr (1.34 kg/mm-hr) to 30 (1.69 kg/mm-hr), or 40 lb/in-hr (2.25 kg/mm-hr). Note that for the "Maximum Die Rate" in the English unit, the die dimension is the die circumference, while in metric units, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

The polyolefin compositions can be processed at advantageously low temperatures. In any embodiment, the polyolefin composition can be processed, such as melt extruded, at barrel temperatures of less than 210° C., 200° C., or 190° C., or from about 160° C., about 170° C., about 175° C., about 180° C., or about 185° C. to about 190° C., about 195° C., about 200° C., about 205° C., or about 210° C.; and die temperatures of less than 210° C., or from about 190° C., about 200° C., or about 205° C. to about 210° C.

In any embodiment, a method of forming a finished film includes extruding a molten polyolefin composition through a die opening to form a film and causing the film to progress in a direction away from the die opening, such as in the molten state, partially molten, or softened due to some partial cooling. The method also includes cooling the molten polyolefin composition in the form of a film at a distance from the die opening, the distance adjusted to effect the properties of the film (e.g., to allow relaxation of the molten polyolefin composition prior to solidification and/or crystallization upon cooling), and isolating a finished film therefrom.

In some examples, a method of forming a film includes extruding the polyolefin composition through one or more die openings to form the film. For example, the method can include extruding a molten polyolefin composition containing one or more BOCD polyethylenes and one or more polypropylenes through the die opening to form the film, and then cooling the film at a distance away from the die opening to produce a finished film. The film can be cooled by blowing air, nitrogen, argon, or other gases on at least a portion of the film. In one or more examples, the molten polyolefin composition can include about 40 wt % to about 95 wt % of the BOCD polyethylene and about 5 wt % to about 60 wt % of the polypropylene, by weight of the polyolefin composition. In some examples, the BOCD polyethylene contains about 70 mol % to about 100 mol % of ethylene and has a density of about 0.91 g/cm$^3$ to about 0.925 g/cm$^3$, in accordance with ASTM D-4703 and ASTM D-1505/ISO 1183 and a branching index ($g'_{vis}$) of 0.98 or greater.

In any embodiment, a film containing the polyolefin composition has a thickness of from about 10 μm, about 30 μm, or about 50 μm to about 100 μm, about 200 μm, about 300 μm, or about 500 μm. In some examples, the film is a monolayer that has a thickness of from about 10 μm to about 100 μm, about 20 μm to about 80 μm, or about 30 μm to about 60 μm. In other examples, the film has a thickness of from about 50 μm to about 300 μm, about 60 μm to about 200 μm, or about 80 μm to about 150 μm.

In one or more examples, the film, the core, or other monolayer contains from about 75 wt % to about 95 wt % of the BOCD polyethylene and from about 5 wt % to about 25 wt % of the polypropylene, by weight of the polyolefin composition. The film has an Elmendorf Tear MD of from about 7.2 g/μm to about 10 g/μm, about 7.5 g/μm to about 9.5 g/μm, or about 8 g/μm to about 9.2 g/μm and an Elmendorf Tear TD of from about 12.8 g/μm to about 16 g/μm, about 13 g/μm to about 14.5 g/μm, or about 13.5 g/μm to about 14 g/μm.

In other embodiments, the film includes a core layer disposed between two skin layers. Both skins can have the same composition, or alternatively, each of the skins can have a different composition than the each other. The core layer includes the polyolefin composition which contains one or more HMS PPs or one or more tPPs. In some examples, each of the skin layers can independently contain the polyolefin composition, the BOCD, an LLDPE, the polypropylene, or any combination thereof.

By "extruding" what is meant is that the polymer and/or polymer blend if formed into a melt such as by heating and/or sheer forces and is forced to blend with other polymers and/or components (e.g., the polyethylene and the modifier) and is then forced out of a die in a desirable form or shape to affect the form or shape of the emanating polymer melt, such as in a film, such as a tubular film. Any suitable apparatus will be appropriate to provide "extrusion" such as a single or twin-screw extruder, or other melt-blending device as is known in the art and that can be fitted with a suitable die.

By "at a distance from the die", what is meant is that the "cooling device", such as a cooling ring that blows air on the forming film, is located at least 1 cm, 2 cm, 4 cm, or 8 cm from the die (or other distance as described herein) such as measured from the top or outer edge of the die to the base of the cooling device.

By "causing the film to progress", what is meant is that the film forming from the die opening from hardening polyethylene is pulled or pushed mechanically or by some other means such as by air pressure (negative or positive) away from the die to create a continuous finished film.

In a typical process, a polyethylene melt is extruded through a die such as an annular slit die, usually vertically, to form a thin walled tube. Cooling can be conducted in the air or other gas which is introduced via a ring in the center of the die to blow up the tube like a balloon. Cooling could also be provided by other means, and the air may be nitrogen/oxygen or other gases or mixtures of gases or liquids. Mounted on top of the die, a high-speed air ring blows onto the hot film to cool the film. The cooling occurs at some distance from the die, which is at least 1 cm as described above. The tube of film can then continue upwards, continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

The lay-flat film is then either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is done either in line with the blown film process or at a later stage.

In some examples, the expansion ratio between die and blown tube of film would be 1.5 times to 4 times the die diameter. The films were blown at a temperature of about 400° F. (about 204° C.) to about 500° F. (about 260° C.), such as about 410° F. (about 210° C.) to about 465° F. (about 241° C.). The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

In any embodiment, the polyolefin compositions described herein are suitable for stand up, but preferably flexible, packs or pouches. Such packs would be stiff enough to be formed into a shape to allow it to stand upright, for instance, with labeling on the front, but flexible and soft enough to allow a user to bend and/or squeeze the pack to force and/or pour liquid, gel, or flowable solids from an opening or open top of the pack. The polyethylene content can be adjusted to provide the toughness and low temperature packaging integrity for the pouch while the polypropylene content can be adjusted to provide stiffness and heat resistance during defrosting and/or microwave reheating of the pouch or pack. The packs and pouch can be used for collecting, storing and serving food items such as juice, vegetables, dairy products, desserts, flowable solids, and/or purees. Thus in any embodiment is a flexible food pack comprising the polyolefin composition of any one of the preceding claims, wherein the polyolefin composition preferably comprises within the range from 5, or 10 to 40, or 50 wt % of the polypropylene, and from within the range from 50, or 60 to 90, or 95 wt % of the polyethylene, each by weight of the composition; and wherein the polyolefin composition is a film that is optionally laminated to one or more additional polymeric films. Such additional films could be the same or different polyolefin materials and could include a metallized layer of material if microwave heating is not desired.

EXAMPLES

Monolayers with a thickness of 50 μm were prepared with various concentrations of BOCD PE (Exceed™ XP 8656ML BOCD PE, available from ExxonMobil Chemical Co.) and polypropylene ("PP", or Achieve™ Advanced PP0502E1, available from ExxonMobil Chemical Co. and having a melt strength of 2.5 cN at 190° C. as measured using a Rheotens test apparatus), as listed in Table 1. Sample 1 was a control sample and contained 100% BOCD PE. Samples 2-7 contained the polyolefin composition having a decreasing amount of BOCD PE and an increasing amount of PP, respectively, as provided in Table 1.

TABLE 1

| Sample | | 1 | 2 | 3 | 4 | 5 | 6 | 7 |
|---|---|---|---|---|---|---|---|---|
| Thickness | μm | 50 | 50 | 50 | 50 | 50 | 50 | 50 |
| % Exceed ™ XP 8656ML | % | 100 | 90 | 80 | 70 | 60 | 50 | 40 |
| %PP | % | 0 | 10 | 20 | 30 | 40 | 50 | 60 |
| Film Properties | Unit | | | | | | | |
| Dart Impact (Method A/non seal up) | g | >2035 | 2006 | 1330 | 352 | 199 | 51.5 | 39.3 |
| Dart Impact (Method A) | g/μm | 40.7 | 40.12 | 26.6 | 6.07 | 3.43 | 0.92 | 0.7 |
| Elmendorf Tear MD | g | 344.0 | 405.0 | 477.8 | 308 | 182 | 89.40 | 51 |
| Elmendorf Tear MD | g/μm | 6.6 | 8.0 | 9.1 | 5.5 | 3.3 | 1.7 | 0.9 |
| Elmendorf Tear TD | g | 634.1 | 675.6 | 637.1 | 637.3 | 694.6 | 580.4 | 391.8 |
| Elmendorf Tear TD | g/μm | 12.7 | 13.7 | 13.7 | 11.1 | 12.1 | 10.9 | 7.8 |
| Tensile at Break MD | MPa | 72.2 | 71.1 | 63.2 | 44.9 | 61.4 | 66.9 | 70.6 |
| Tensile at Break TD | MPa | 63.0 | 63.0 | 58.7 | 31.4 | 37.3 | 40.8 | 43.8 |
| 1% secant modulus MD | MPa | 210 | 321 | 443 | 504 | 627 | 840 | 1037 |
| 1% secant modulus TD | MPa | 294 | 345 | 435 | 455 | 570 | 770 | 955 |

Samples 2-7 showed that the polyolefin composition increased the film stiffness as the 1% secant modulus values in both MD and TD increased with the increasing concentrations of PP. Also, for Samples 2 and 3, the Elmendorf Tear values in both MD and TD increased with the increasing concentrations of PP, but for Samples 4-7, the Elmendorf Tear values in both MD and TD decreased with the increasing concentrations of PP.

As provided in Table 2, Samples 8-14 are three-layer films having a core layer disposed between two skin layers were produced with a thickness of 90 μm. The core and skin layers of the three-layer films were prepared with various concentrations of BOCD PE to (Exceed™ XP 8656ML polyethylene, available from ExxonMobil Chemical Co.), PP (Achieve™ Advanced PP0502E1), and/or about 9 wt % of pigmented LLDPE (A. Schuleman "Polywhite L8100"), as listed in Table 2.

Samples 8 and 12 contained 100% BOCD PE in the skin layers and contained the polyolefin composition having varying amounts of BOCD PE and PP in the core layers. Samples 9-11, 13, and 14 contained the polyolefin composition having varying amounts of BOCD PE and PP in the skin and core layers, as provided in Table 2.

Among PP/BOCD PE three-layer films, moving some PP from core layer to skin layer, such as from Sample 8 through Sample 11 and Sample 12 through Sample 14, increased film toughness properties with similar stiffness properties because of same PP content. The skin layer with 10% of PP (Samples 9 and 13) achieved the highest dart impact at same PP level. The MD tear value had a trend of increasing with the greater concentrations of the PP in skins.

TABLE 2

| Sample | | 8 | 9 | 10 | 11 | 12 | 13 | 14 |
|---|---|---|---|---|---|---|---|---|
| % PP | | 20% | 20% | 20% | 20% | 25% | 25% | 25% |
| Thickness (μm) | | 90 | 90 | 90 | 90 | 90 | 90 | 90 |
| Skin | | 100% BOCD PE | 90% BOCD PE + 10% PP | 85% BOCD PE + 15% PP | 80% BOCD PE + 20% PP | 100% BOCD PE | 90% BOCD PE + 10% PP | 85% BOCD PE + 15% PP |
| Core | | 51% BOCD PE + 40% PP + 9% L8100 | 61% BOCD PE + 30% PP + 9% L8100 | 66% BOCD PE + 25% PP + 9% L8100 | 71% BOCD PE + 20% PP + 9% L8100 | 49.4% BOCD PE + 41.6% PP + 9% L8100 | 56% BOCD PE + 35% PP + 9% L8100 | 59.3% BOCD PE + 31.7% PP + 9% L8100 |
| Layer distr. | | 1/2/1 | 1/2/1 | 1/2/1 | 1/2/1 | 1/3/1 | 1/3/1 | 1/3/1 |
| Film Properties | Unit | | | | | | | |
| Dart Impact (Method A) | g | 1269 | 1625 | 1602 | 1541 | 972 | 1221 | 1152 |
| Dart Impact (Method A) | g/μm | 14.1 | 17.9 | 17.8 | 16.6 | 10.8 | 13.1 | 12.8 |
| Elmendorf tear MD | g | 658 | 964 | 1099 | 1165 | 532 | 844 | 1016 |
| Elmendorf tear MD | g/μm | 7.4 | 10.5 | 12.3 | 12.5 | 5.8 | 9.1 | 11.2 |
| Elmendorf tear ID | g | 1618 | 1479 | 1208 | 1179 | 1255 | 1556 | 1311 |
| Elmendorf tear ID | g/μm | 17.8 | 15.9 | 13.3 | 12.6 | 13.5 | 16.6 | 14.4 |
| Tensile at Break MD | MPa | 51 | 49.2 | 46.1 | 50.8 | 49.0 | 48.7 | 50.3 |
| Tensile at Break TD | MPa | 44.9 | 40.9 | 52.4 | 45.7 | 44.0 | 45.6 | 45.9 |

TABLE 2-continued

| Sample | | 8 | 9 | 10 | 11 | 12 | 13 | 14 |
|---|---|---|---|---|---|---|---|---|
| 1% Modulus MD | MPa | 544 | 539 | 486 | 544 | 646 | 614 | 612 |
| 1% Modulus TD | MPa | 590 | 498 | 531 | 478 | 658 | 590 | 570 |

PP and BOCD PE blend morphology: The unique film properties on both the monolayer and three-layer film, such as the morphology of PP/Exceed XP blends, were studied by Focused Ion Beam Scanning Electron Microscopy ("FIB-SEM") using a Helios Nanolab™ G3 UC manufactured by FEI™. The FIB-SEM allows in situ cross sectioning of samples by etching material away with a focused gallium ion beam (FIB) and recording the micrographs with the electron beam (SEM). The film samples were stained with $RuO_4$ (ruthenium tetroxide) vapor following the method developed by Brown and Butler in 38(15) POLYMER 3937-3945 (1997) to enhance the contrast of polymers, based on their crystallinity. Low-crystallinity materials take up more stain than high-crystallinity materials; higher concentrations of stain appear brighter when imaged using back-scattered electrons. After applying a conductive coating to the sample surface, local cross-sections were made by the FIB. The cross sections were examined at an electron energy of 2 keV and images were recorded using the in-lens detectors which were set to be primarily sensitive to back-scattered electrons. The crystallinity rates of hPP and LLDPE are different, so FIB-SEM was used to observe PP inclusions as dark features and PE inclusions as bright features. In addition, the highly crystalline PE lamellae appear darker than the less crystalline PE matrix.

The PP (lean) was blended with BOCD PE similar to the skin layer of three-layer film. The PP revealed tube-liked inclusions. When the PP blending ratio was increased to 40%, similar to the core layer of three-layer film, PP revealed nanolayer-liked inclusions among PE. Interestingly, the PE-lamellae went through the PP-structures and continued on tying up and strengthening the structure, which happened on both skin and core. In addition, some of PE-lamellae from the core went through the PP-features in the core layer and continued into the skin layer. The same observation was made as PE-lamellae from the skin layer. Similar morphology could be found in PP/BOCD PE monolayer blending, which was not as uniform as three-layer film. Without being bound by theory, it is believed that the PE-lamellae interpenetrate the PP domains to promote tying up and strengthening of the composition structure to provide one or more of the improved properties that were observed in the polyolefin composition.

As provided below in Tables 3 and 4, Samples 15-22 are three-layer films having a core layer disposed between two skin layers were produced with thicknesses ranging from about 3.94 mils to about 4.30 mils. Table 3 provides the composition of Samples 15-22 and Table 4 provides the physical properties of Samples 15-22. All of the skin layers in Samples 15-22 contained the following additives: about 2 wt % of an anti-blocking agent, about 1 wt % of a slip agent, and about 1 wt % of a polymer processing aid masterbatch (PPA MB).

Sample 15 has a core layer containing a high density polyethylene (HDPE, SURPASS® HPs 167-AB resin, available from Nova Chemicals), one skin layer containing BOCD PE-2 (Exceed™ XP 1018 HA polyethylene, available from ExxonMobil Chemical Co.), and one skin layer containing a linear low-density polyethylene (LLDPE, LL 1001.32).

Sample 16 has a core layer containing a high density polyethylene (HDPE, 7845.30, available from ExxonMobil Chemical Co.) and two skin layers containing BOCD PE (Exceed™ XP 8656ML polyethylene, available from ExxonMobil Chemical Co.).

Sample 17 has a core layer containing a high density polyethylene (HDPE, 7845.30, available from ExxonMobil Chemical Co.) and two skin layers containing a mixture of BOCD PE (Exceed™ XP 8656ML polyethylene, available from ExxonMobil Chemical Co.) and a linear low-density polyethylene (LLDPE, LL 1001.32).

Sample 18 has a core layer containing a mixture of BOCD PE (Exceed™ XP 8656ML polyethylene, available from ExxonMobil Chemical Co.) and a high density polyethylene (HDPE, SURPASS® HPs 167-AB resin, available from Nova Chemicals) and two skin layers containing a mixture of BOCD PE (Exceed™ XP 8656ML polyethylene, available from ExxonMobil Chemical Co.) and a linear low-density polyethylene (LLDPE, LL 1001.32).

Samples 19-22 have a core layer containing the polyolefin composition with various mixtures of BOCD PE (Exceed™ XP 8656ML polyethylene, available from ExxonMobil Chemical Co.) and the PP (Achieve™ Advanced PP0502E1), as provided in Table 3, wherein in Sample 15 each skin has a different composition, but the other samples have the same skin compositions.

TABLE 3

| Sample | Skins (25%/25%) | Core (50%) |
|---|---|---|
| 15 | BOCD PE-2-96%; Antiblock MB-2% Slip MB-1%, PPA-1% LL 1001.32- 96% Antiblock MB-2%, Slip MB-1%, PPA MB-1% | HDPE (Surpass HPs 167-AB)- 100% |
| 16 | BOCD PE- 96% Antiblock MB-2%, Slip MB-1% PPA MB-1% | HDPE 7845.30- 100% |
| 17 | BOCD PE-66%, LL 1001.32- 30%; Antiblock MB-2%, Slip MB-1%, PPA MB-1% | HDPE 7845.30- 100% |
| 18 | BOCD PEML-66%, LL 1001.32- 30%; Antiblock MB-2%, Slip MB-1%, PPA MB-1% | BOCD PE- 60% + Nova (Surpass HPs 167-AB)-40% |
| 19 | BOCD PE-96% Antiblock MB-2% Slip MB-1% PPA MB-1% | BOCD PE-60% + PP- 40% |
| 20 | BOCD PE-96% Antiblock MB-2% Slip MB-1% PPA MB-1% | BOCD PE-60% + PP-40% |

TABLE 3-continued

| Sample | Skins (25%/25%) | Core (50%) |
|---|---|---|
| 21 | BOCD PE-96% Antiblock MB-2% Slip MB-1% PPA MB-1% | BOCD PE-70% + PP- 30% |
| 22 | BOCD PE-66%, LL 1001.32- 30%; Antiblock MB-2%, Slip MB-1%, PPA MB-1% | BOCD PE-70% + PP- 30% |

All film samples were made on three layer Alpine II extruder under the following conditions. Extruder A (HX65-G) for a first skin layer had a Feed Throat Temperature of about 27° C., Barrels #1-#4 Temperature of about 185° C., Barrel #5 Temperature of about 193° C., and Zones #6-#7 Temperature of about 193° C. Extruder B (HX90-G) for a core layer had a Feed Throat Temperature of about 27° C., Barrels #1-#4 Temperature of about 185° C., Barrel #5 Temperature of about 193° C., and Zones #6-#7 Temperature of about 193° C. Extruder C (HX65-S) for a second skin layer had a Feed Throat Temperature of about 27° C., Barrel #1 Temperature of about 177° C., Barrel #2 Temperature of about 204° C., Barrels #3-#4 Temperature of about 199° C., Barrel #5 Temperature of about 199° C., Zones #6-#7 Temperature of about 199° C., Die Zones #1-#4 Temperature of about 204° C., IBC Ring Temperature of about 18° C., Air Ring Temperature of about 18° C., and Nip Roll Temperature of about 27° C.

TABLE 4

| Sample | Method Used | 15 | 16 | 17 | 18 |
|---|---|---|---|---|---|
| Gauge Mic (mils) | | | | | |
| Average | ASTM D6988 | 3.94 | 4.25 | 4.03 | 4.02 |
| Low | | 3.75 | 4.05 | 3.83 | 3.78 |
| High | | 4.10 | 4.49 | 4.14 | 4.21 |
| 1% Secant (psi) | | | | | |
| MD | Secant/Tensile | 95,560 | 74,034 | 74,211 | 43,616 |
| TD | Described below | 118,437 | 96,665 | 91,716 | 55,557 |
| Tensile Yield Strength (psi) | | | | | |
| MD | Secant/Tensile | 2,725 | 2,564 | 2,470 | 1,695 |
| TD | Described below | 3,278 | 2,644 | 2,839 | 1,892 |
| Elongation @ Yield (%) | | | | | |
| MD | | 5.9 | 8.3 | 5.8 | 6.5 |
| TD | | 6.4 | 5.5 | 5.6 | 6.1 |
| Tensile Strength (psi) | | | | | |
| MD | | 5,463 | 6,016 | 6,291 | 6,163 |
| TD | | 4,700 | 5,332 | 5,378 | 5,923 |
| Elongation @ Break (%) | | | | | |
| MD | | 724 | 643 | 690 | 641 |
| TD | | 673 | 641 | 717 | 703 |
| Elmendorf Tear | | | | | |
| MD (g) | ASTM D1922 | 203 | 414 | 246 | 1343 |
| TD (g) | | 655 | 2020 | 1633 | 2071 |
| Dart Drop | | | | | |
| Phenolic Method A (g) (g/mil) | ASTM D1709 | 158 40 | 614 144 | 392 97 | 1092 272 |
| Dart Drop | | | | | |
| Stainless Method B (g) (g/mil) | ASTM D1709 | — — | — — | — — | — — |
| Puncture | | | | | |
| BTEC Probe Method B1 Peak Force (lbs) | Puncture | 20.85 | 31.27 | 31.55 | 26.95 |
| Peak Force (lbs/mil) | | 6.29 | 7.36 | 7.83 | 6.70 |
| Break Energy (in-lbs) | | 17.53 | 48.68 | 56.28 | 49.67 |
| Break Energy (in-lbs/mil) | | 4.45 | 11.46 | 13.97 | 12.36 |
| Sample | Method Used | 19 | 20 | 21 | 22 |
| Gauge Mic (mils) | | | | | |
| Average | ASTM D6988 | 4.24 | 4.30 | 4.23 | 4.06 |
| Low | | 4.01 | 4.12 | 4.01 | 3.86 |
| High | | 4.35 | 4.55 | 4.47 | 4.26 |

TABLE 4-continued

| 1% Secant (psi) | | | | | |
|---|---|---|---|---|---|
| MD | Secant/Tensile | 59,062 | 58,261 | 51,822 | 50,238 |
| TD | Described below | 60,589 | 61,648 | 51,534 | 48,489 |
| Tensile Yield Strength (psi) | | | | | |
| MD | Secant/Tensile | 1,951 | 2,564 | 2,470 | 1,695 |
| TD | Described below | 2,005 | 2,644 | 2,839 | 1,892 |
| Elongation @ Yield (%) | | | | | |
| MD | | 5.6 | 8.3 | 5.8 | 6.5 |
| TD | | 6.1 | 5.5 | 5.6 | 6.1 |
| Tensile Strength (psi) | | | | | |
| MD | | 6,125 | 6,352 | 6,618 | 6,709 |
| TD | | 5,949 | 6,299 | 6,274 | 6,267 |
| Elongation @ Break (%) | | | | | |
| MD | | 589 | 564 | 595 | 608 |
| TD | | 655 | 656 | 664 | 678 |
| Elmendorf Tear | | | | | |
| MD (g) | ASTM D1922 | 1203 | 1273 | 1579 | 1447 |
| TD (g) | | 2095 | 2076 | 1555 | 1853 |
| Dart Drop | | | | | |
| Phenolic Method A (g) (g/mil) | ASTM D1709 | ≥1382 ≥326 | ≥1382 ≥321 | ≥1382 ≥327 | ≥1382 ≥340 |
| Dart Drop | | | | | |
| Stainless Method B (g) (g/mil) | ASTM D1709 | 971 229 | 1347 313 | >1455 >344 | 1115 275 |
| Puncture | | | | | |
| BTEC Probe Method B1 Peak Force (lbs) | Puncture | 29.49 | 30.06 | 27.85 | 26.85 |
| Peak Force (lbs/mil) | | 6.95 | 6.99 | 6.58 | 6.61 |
| Break Energy (in-lbs) | | 57.38 | 56.56 | 56.21 | 63.67 |
| Break Energy (in-lbs/mil) | | 13.53 | 13.15 | 13.29 | 13.22 |

The results demonstrated BOCD PE either neat or in blends with LLDPE provided superior physical properties, especially Dart, Tear, and Puncture when used in blends containing PP to produce the polyolefin compositions. The PP offers unique advantages in terms of stiffness and the same in combination with BOCD PE offers superior stiffness/toughness balance. The same is highly desirable for applications where a polypropylene is needed for its unique properties but without sacrificing toughness at the same time. The unique molecular architecture of the BOCD structure is a key parameter in enhancing the physical properties. Also, the results seem to indicate some sort of synergy BOCD PE blends when combined with PP to produce the polyolefin compositions.

Extrapolated from Table 4, the following results were determined:

I. Samples 19-22 vs Sample 15 BOCD PE/BOCD PE+C-4 LL (Skins) with BOCD PE+PP (Core) vs Exceed (Skin) with HDPE HPs 167-AB (core) demonstrated: 493%-677% (almost 5-7x) Higher MD Tear (g); 700% (almost 7x) Higher Dart Drop (g/mil) based on Method A, Samples 19-22 had to be tested by a higher Dart Method (Method B) as test samples had reached the Maximum limit when tested by Method A; and 195%-204% (almost 2x) Higher Puncture (in-lbs/mil).

II. Samples 19-22 vs Sample 18 BOCD PE/BOCD PE+C-4 LL (Skins) with BOCD PE+PP (Core) vs BOCD PE+C4LL (Skins) with BOCD PE+HDPE HPs167-AB (core) demonstrated: 17% Higher MD Tear (g)–Sample 21 vs Sample 18; Dart drop (g/mil) for Samples 19-22 had to be tested by a higher Dart Method (Method B) as they had reached the Maximum limit when tested by Method A. Sample 18 dart could be still measured by Method A; and 9% Higher Puncture (in-lbs/mil)–Sample 19 vs Sample 18.

III. Samples 19-22 vs Sample 16 BOCD PE/BOCD PE+C-4 LL (Skins) with BOCD PE+PP (Core) vs Exceed XP (Skins) with HDPE 7845.30 (core) demonstrated: 190%-280% (almost 2-3x) Higher MD Tear (g); About 120% (almost 1.2 x) Higher Dart Drop (g/mil) based on Method A, Samples 19-22 had to be tested by a higher Dart Method (Method B) as they had reached the Maximum limit when tested by Method A; About 15% Higher Puncture (in-lbs/mil).

IV. Samples 19-22 vs Sample 17 BOCD PE/BOCD PE+C-4 LL (Skins) with BOCD PE+PP (Core) vs Exceed XP+C-4 LL (Skins) with HDPE 7845.30 (core) demonstrated: 389%-542% (almost 4-5x) Higher MD Tear (g); About 230% (almost 2.3x) Higher Dart Drop (g/mil) based on Method A, Samples 19-22 had to be tested by a higher Dart Method (Method B) as they had reached the Maximum limit when tested by Method A.

V. Toughness BOCD PE helps in boosting the overall toughness properties of films and blending 30% C-4 LL with BOCD PE doesn't seem to negatively affect the properties.

Synergy is obtained when XP/XP+C-4 LL is combined with PP which enhances the toughness properties significantly. BOCD PE/BOCD PE+C-4 LL blends with PP significantly improved toughness properties when compared to films based on HDPE in the core.

The 1% secant flexural modulus determined by the following: Equipment used: The United Six (6) station, 60 Degree machine contains the following: A load frame testing console containing an electrically driven crosshead mounted to give horizontal movement. Opposite the crosshead are mounted six (6) separate load cells. These load cells are tension load cells.

Units #1 and #3 have load cells with a range of 0-35 pounds. Unit #2 has load cells with a range of 0-110 pounds. Each load cell is equipped with a set of air-actuated jaws. Each jaw has faces designed to form a line grip. The jaw combines one standard flat rubber face and an opposing face from which protrudes a metal half-round. Units #1 and #3 have 1¼" wide jaws and Unit #2 has 2¼" wide jaws. Secant Modulus is to be tested on Units #1 and #3 only Sample preparation: The specimens are conditioned and tested under ASTM laboratory conditions. They are maintained at 23±2° C. and 50%+10% relative humidity. Conditioning time is a minimum of 40 hours under lab conditions and 48 hours after manufacturing. Prepare 12 specimens of each material; six in the machine direction (MD), the direction of flow as polymer exits the die, and six in the transverse direction (TD), the direction perpendicular to the flow as polymer exits the die.

Note: It is recommended that materials only 0-3 mils should be tested on Units #1 and #3 and all material thickness can be tested on Unit #2. But note that oriented PP which measures 0.7 mils can have loads up to 35 lbs. When testing unfamiliar materials, use caution and watch loads.

Each specimen should be 1" wide and 7" long. The width (1") of the samples should be cut with the JDC precision, fixed-blade cutters. These cutters are used since nicks or cuts in specimens initiate premature breaks. After cutting each specimen, examine visually to insure the edges are undamaged (free of nicks). On a periodic basis the owner of the cutters will monitor specimen edge quality by microscopic examination.

Testing information: Secant Modulus: (Based on ASTM-D882-10)
Template (#) Test Method:
(5) 1% Secant Modulus Properties of Film ORG (Units #1 and #3 Only)
(9) 1% and 2% Secant Modulus Properties of Film ORG (Units #1 and #3 Only)
(14) 1% and 5% Secant Modulus Properties of Film ORG (Units #1 and #3 Only)

Methods of film fabrication, density, resin grade, resin type, and thickness all affect testing data. The stiffness properties are determined based on ASTM D882-10. These methods use a jaw separation of 5 inches and a sample 1-inch wide. The index of stiffness of thin films is determined by pulling the specimen at a rate of jaw separation (crosshead speed) of 0.5 inches per minute to a designated strain of 1%, or 1% and 2%, or 1% and 5% of its original length and recording the load at these points.

Overall, polyolefin compositions of the present disclosure and films made therefrom provide enhanced toughness and high stiffness.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

We claim:

1. A film having a thickness of about 10 μm to about 300 μm, wherein:
   the film comprises a core layer disposed between two skin layers; and
   the core layer and one or two of the skin layers comprises a polyolefin composition, the polyolefin composition comprising:
   a) a broad orthogonal composition distribution (BOCD) polyethylene comprising about 70 mol % to about 100 mol % of ethylene and having:
      i. a density of about 0.91 g/cm$^3$ to about 0.925 g/cm$^3$, in accordance with ASTM D-4703 and ASTM D-1505/ISO 1183;
      ii. a branching index ($g'_{vis}$) of 0.98 or greater; and
      iii. $M_{w1}/M_{w2}$ of about 1.5 to about 8 and a $T_{w1}-T_{w2}$ of about −5° C. to about −40° ° C., wherein:
         $T_{w1}$ is the temperature at which 50 wt % or less of the cumulative molecular weight polyethylene fractions elutes;
         $T_{w2}$ is the temperature at which greater than 50 wt % cumulative molecular weight polyethylene fractions elutes;
         $M_{w1}$ is a molecular weight component comprising the molecular weight fractions eluting at $T_{w1}$;
         $M_{w2}$ a molecular weight component comprising molecular weight fractions eluting at $T_{w2}$, and
         values for $T_{w1}$, $T_{w2}$, $M_{w1}$, and $M_{w2}$ are determined by cross-fractionation chromatography (CFC); and
   b) a trimmed polypropylene (tPP) produced from a high melt strength polypropylene (HMS PP) having a melt strength of at least 20 cN determined using an extensional rheometer at 190° C.

2. The film of claim 1, wherein the polyolefin composition comprises about 40 wt % to about 95 wt %, by weight of the polyolefin composition, of the BOCD polyethylene; and about 5 wt % to about 60 wt %, by weight of the polyolefin composition of the polypropylene.

3. The film of claim 1, wherein the polyolefin composition has a 1% secant flexural modulus MD of about 300 MPa to about 1,200 MPa, as determined for a layer of the polyolefin composition having a thickness of about 50 μm.

4. The film according to claim 1, wherein the polyolefin composition has a 1% secant flexural modulus TD of about 340 MPa to about 1,200 MPa, as determined for a layer of the polyolefin composition having a thickness of about 50 μm.

5. The film according to claim 1, wherein the BOCD polyethylene has a density of about 0.912 g/cm$^3$ to about 0.918 g/cm$^3$, in accordance with ASTM D-4703 and ASTM D-1505/ISO 1183.

6. The film according to claim 1, wherein the BOCD polyethylene has a density of about 0.915 g/cm$^3$ to about 0.921 g/cm$^3$, in accordance with ASTM D-4703 and ASTM D-1505/ISO 1183.

7. The film according to claim 1, wherein the BOCD polyethylene has a branching index ($g'_{vis}$) of about 0.985 to 1.0.

8. The film of claim 1, wherein the polyolefin composition further comprises a linear low-density polyethylene (LLDPE).

9. The film of claim 8, wherein the LLDPE is in a concentration of about 10 wt % to about 40 wt %, by weight of the polyolefin composition.

10. The film of claim 8, wherein the LLDPE comprises ethylene derived units and comonomers selected from C3 to C10 alpha-olefin derived units.

\* \* \* \* \*